(12) United States Patent
Lei et al.

(10) Patent No.: US 12,549,606 B2
(45) Date of Patent: *Feb. 10, 2026

(54) NETWORK SECURITY MANAGEMENT METHOD, AND APPARATUS

(71) Applicant: Huawei International Pte. Ltd., Singapore (SG)

(72) Inventors: Zhongding Lei, Singapore (SG); Lichun Li, Singapore (SG); Haiguang Wang, Singapore (SG); Xin Kang, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,304

(22) Filed: Jan. 17, 2024

(65) Prior Publication Data
US 2024/0223613 A1 Jul. 4, 2024

Related U.S. Application Data

(63) Continuation of application No. 17/939,637, filed on Sep. 7, 2022, now Pat. No. 11,895,157, which is a
(Continued)

(51) Int. Cl.
*H04L 9/40* (2022.01)
*H04W 76/10* (2018.01)

(52) U.S. Cl.
CPC .............. *H04L 63/20* (2013.01); *H04L 63/08* (2013.01); *H04W 76/10* (2018.02)

(58) Field of Classification Search
CPC ..... H04L 63/20; H04L 63/08; H04L 63/0815; H04W 12/06; H04W 76/10
(Continued)

(56) References Cited

U.S. PATENT DOCUMENTS 7,769,838 B2   8/2010   Cheline et al.
8,780,856 B2   7/2014   Madour et al.
(Continued)

FOREIGN PATENT DOCUMENTS

CN   101656956 A   2/2010
CN   101827112 A   9/2010
(Continued)

OTHER PUBLICATIONS

U.S. Appl. No. 17/939,637, filed Sep. 7, 2022.
(Continued)

*Primary Examiner* — Benjamin A Kaplan
(74) *Attorney, Agent, or Firm* — Leydig, Voit & Mayer, Ltd.

(57) ABSTRACT

Embodiments of this application provide a network security management method and an apparatus. The method includes: receiving, by a first network device, a session request sent by a terminal device, where the session request is used to request establishment of a first session with a first data network, the session request includes first authentication information for the first session, and the first authentication information includes identifier information of the first data network; obtaining, by the first network device, second authentication information for a second session of the terminal device, where the second authentication information includes identifier information of a second data network to which the second session is connected; and if the identifier information of the first data network is the same as the identifier information of the second data network, authorizing the terminal device to establish the first session with the first data network.

20 Claims, 13 Drawing Sheets

Related U.S. Application Data continuation of application No. 16/746,479, filed on Jan. 17, 2020, now Pat. No. 11,477,242, which is a continuation of application No. PCT/SG2017/050368, filed on Jul. 20, 2017.

(58) Field of Classification Search
USPC .......................................................... 726/4
See application file for complete search history.

(56) References Cited

U.S. PATENT DOCUMENTS

| | | | |
|---|---|---|---|
| 9,439,067 | B2 | 9/2016 | Cherian et al. |
| 10,560,879 | B2 | 2/2020 | Hampel et al. |
| 10,575,173 | B2 | 2/2020 | Agarwal et al. |
| 11,196,728 | B1 | 12/2021 | Fu et al. |
| 2012/0102174 | A1 | 4/2012 | Zhou et al. |
| 2013/0331063 | A1 | 12/2013 | Cormier et al. |
| 2017/0027007 | A1 | 1/2017 | Roeland |
| 2019/0246275 | A1 | 8/2019 | Nakarmi et al. |

FOREIGN PATENT DOCUMENTS

| | | |
|---|---|---|
| CN | 103533666 A | 1/2014 |
| CN | 103944737 A | 7/2014 |
| CN | 105873059 A | 8/2016 |
| CN | 106302376 A | 1/2017 |
| JP | 2017055407 A | 3/2017 |
| JP | 2020506578 A | 2/2020 |
| KR | 20170058762 A | 5/2017 |
| WO | 2008099254 A2 | 8/2008 |

OTHER PUBLICATIONS

U.S. Appl. No. 16/746,479, filed Jan. 17, 2020.

"3rd Generation Partnership Project; Technical Specification Group Services and System Aspects; Study on Architecture for Next Generation System (Release 14)," 3GPP TR 23.799 V14.0.0, XP051295448, pp. 1-527, 3rd Generation Partnership Project, Valbonne, France (Dec. 2016).

"EPS-AKAi: A primary authentication solution for 5G NR access," 3GPP TSG SA WG3 (Security) Meeting #87, Ljubljana, Slovenia, S3-171198, pp. 1-3, 3rd Generation Partnership Project, Valbonne, France (May 15-19, 2017).

"3rd Generation Partnership Project; Technical Specification Group Services and System Aspects; System Architecture for the 5G System; Stage 2 (Release 15)," 3GPP TS 23.501 V1.0.0, pp. 1-146, 3rd Generation Partnership Project, Valbonne, France (Jun. 2017).

"Section 5.6.3.3.1, Key Issue Details," 3GPP TSG SA WG3 (Security) Meeting #87, Ljubljana, SL, S3-171598 (revision S3-171048), XP051289779, 3rd Generation Partnership Project, Valbonne, France (May 15-19, 2017).

"EAP based Secondary authentication with PDU session authorization information," 3GPP TSG SA WG3 (Security) Meeting #87, Ljubljana, Slovenia, S3-171329, pp. 1-6, 3rd Generation Partnership Project, Valbonne, France (May 15-19, 2017).

"3rd Generation Partnership Project; Technical Specification Group Services and System Aspects; Procedures for the 5G System; Stage 2 (Release 15)," 3GPP TS 23.502 V0.2.0, pp. 1-71, 3rd Generation Partnership Project, Valbonne, France (Feb. 2017).

"EAP based Secondary authentication with an external Authenticator," 3GPP TSG SA WG3 (Security) Meeting #87, Ljubljana, Slovenia, S3-171387 (revision of S3-170749), pp. 1-4, 3rd Generation Partnership Project, Valbonne, France (May 15-19, 2017).

"3rd Generation Partnership Project; Technical Specification Group Services and System Aspects; Security Architecture and Procedures for 5G System (Release 15)," 3GPP TS 33.501 V0.2.0, pp. 1-25, 3rd Generation Partnership Project, Valbonne, France (May 2017).

"3rd Generation Partnership Project; Technical Specification Group Services and System Aspects; Procedures for the 5G System; Stage 2 (Release 15)," 3GPP TS 23.502 V0.5.0, pp. 1-148, 3rd Generation Partnership Project, Valbonne, France (Jul. 2017).

"EAP based Secondary authentication by an External Data Network," 3GPP TSG SA WG3 (Security) Meeting #86, Nice, France, S3-170177, pp. 1-3, 3rd Generation Partnership Project, Valbonne, France (Feb. 6-10, 2017).

"EAP based secondary authentication for PDU session establishment authorization," 3GPP TSG-SA WG3 Meeting #86, Sophia Antipolis, France, S3-170279, pp. 1-3, 3rd Generation Partnership Project, Valbonne, France (Feb. 6-10, 2017).

"Secondary authentication and authorization using SM NAS signalling," 3GPP TSG SA WG3 (Security) Meeting #86, Sophia Antipolis, France, S3-170298, pp. 1-2, 3rd Generation Partnership Project, Valbonne, France (Feb. 6-10, 2017).

N. Cam-Winget et al., "The Flexible Authentication via Secure Tunneling Extensible Authentication Protocol Method (EAP-FAST)," Request for Comments: 4851, pp. 1-64 {May 2007).

Z. Cao et al., "EAP Extensions for the EAP Re-authentication Protocol (ERP)," Request for Comments: 6696, pp. 1-47 (Jul. 2012).

Zeng Meng-qi et al., "Research Progress on 5G Communication Security," Communications Technology, vol. 50, No. 4, total 6 pages (Apr. 2017). With English abstract.

3rd Generation Partnership Project; Technical Specification Group Services and System Aspects; System Architecture for the 5G System; Stage 2 (Release 15), 3GPP TS 23.501 V0.3.0, total 97 pages, 3rd Generation Partnership Project, Valbonne, France (Feb. 2017).

NETWORK SECURITY MANAGEMENT METHOD, AND APPARATUS

CROSS-REFERENCE TO RELATED APPLICATIONS

This application is a continuation of U.S. patent application Ser. No. 17/939,637, filed on Sep. 7, 2022, which is a continuation of U.S. patent application Ser. No. 16/746,479, filed on Jan. 17, 2020 (now U.S. Pat. No. 11,477,242), which is a continuation of International Application No. PCT/SG2017/050368, filed on Jul. 20, 2017. All of the aforementioned patent applications are hereby incorporated by reference in their entireties.

TECHNICAL FIELD

This application relates to the field of communications technologies, and in particular, to a network security management method and an apparatus.

BACKGROUND

In network security management, a terminal device needs to be authenticated and authorized before accessing a network. The terminal device can access the network only after being authenticated and authorized. In a 4th generation mobile communications technology (4G) network, the terminal device is directly authenticated and authorized by an operator network. This is referred to as primary authentication in a 5th generation wireless (5G), also referred to as new radio (NR), standardization process. A terminal device that requests, by using the operator network, to access a data network (DN) outside the operator network also needs to be authenticated and authorized by the DN before accessing the DN. In the 5G standardization process, this authentication and authorization on the terminal device by the DN is referred to as secondary authentication. The second authentication is usually performed after the first authentication.

In an existing implementation, the terminal device is authenticated and authorized by the DN by using the operator network when the terminal device needs to establish a packet data unit (PDU) session connection to the DN. After the DN feeds back a secondary authentication result of the terminal device to the operator network, the operator network determines, based on the result, whether to establish the PDU session connection to the DN for the terminal device. In the existing implementation, the secondary authentication is performed on a per session basis, and each time the terminal device needs to establish a PDU session with a DN, secondary authentication needs to be performed. If the terminal device needs to establish a plurality of PDU sessions with one DN or different DNs associated with one authentication server (group), authentication needs to be repeated with the DN. Authentication efficiency is low and resources are seriously wasted.

SUMMARY

Embodiments of this application provide a network security management method and an apparatus, so as to improve efficiency of terminal device authentication, reduce resource consumption of terminal device authentication, and enhance applicability of network security management.

A first aspect provides a network security management method, where the method may be executed by a first network device on an operator network, the first network device serves as an identity authenticator, and the method includes:

receiving, by the first network device, a session request sent by a terminal device, where the session request may be used to request the first network device to establish a first session between the terminal device and a first data network, and the session request includes first authentication information for the first session; and authenticating or authorizing, by the first network device based on the first authentication information carried in the session request and preset second authentication information for a second session among a plurality of sessions earlier initiated by the terminal device, the terminal device to establish the first session with the first data network. According to the method provided in this embodiment of this application, when the terminal device initiates a new session, whether to perform fast authentication for the new session may be determined based on authentication information for another session earlier initiated by the terminal device. If authentication is not required for the new session, the terminal device may be directly authorized to establish the new session with the first data network. This can improve efficiency of session establishment, reduce extra signaling overheads between the terminal device, a network device of the operator network, and a data network, and reduce resource consumption of session authentication, and therefore has better applicability.

Optionally, the first authentication information carried in the session request sent by the terminal device may include identifier information of the first data network, and the first network device may obtain, from local storage space, identifier information of a second data network to which the second session earlier initiated by the terminal device is connected. If the identifier information of the first data network is the same as the identifier information of the second data network, the first network device may directly authorize the terminal device to establish the first session with the first data network. The new session initiated by the terminal device can be established without authentication. The terminal device can rapidly perform data transmission interaction with a data network by using a data transmission channel of the new session. Data transmission channel establishment is more efficient with better applicability.

Optionally, that the identifier information of the first data network is the same as the identifier information of the second data network described in this embodiment of this application includes one or any combination of the following:

a data network number DNN of the first data network is the same as a DNN of the second data network; or an authentication server corresponding to the first data network is the same as an authentication server corresponding to the second data network; or a synchronous authentication server group to which an authentication server corresponding to the first data network belongs is the same as a synchronous authentication server group to which an authentication server corresponding to the second data network belongs.

In this embodiment of this application, when a data network to which the new session requests to connect is the same as a data network to which the session earlier initiated by the terminal device is connected, the terminal device may be directly authorized to establish the new session with the data network. In this embodiment of this application, the terminal device may be directly authorized to establish the new session with the data network when an authentication server of a data network to which the new session is connected is the same as an authentication server of a data network to which the session earlier initiated by the terminal device is connected, or the authentication servers are synchronous authentication servers. Directly authorizing the terminal device to establish a session with a data network in this embodiment of this application is adaptable to many scenarios. Hence, better applicability is achieved.

Optionally, when the first network device that serves as the identity authenticator does not store or has not stored subscription data of the terminal device or authentication information for another session earlier initiated, the subscription data of the terminal device or the authentication information for the session earlier initiated may be stored in a second network device. For example, in an application scenario of management by a unified data management network element, the first network device may send an authentication information query request to the second network device, to query the second network device for the authentication information for the session earlier initiated by the terminal device; and the first network device receives the second authentication information for the second session of the terminal device fed back by the second network device, and obtains the identifier information of the second data network from the second authentication information. Further, when the identifier information of the first data network to which the first session requests to connect is the same as identifier information of the data network to which the session earlier initiated by the terminal device is connected, the terminal device is directly authorized to establish a new session (that is, the first session) with the data network. The second session is at least one of a plurality of sessions earlier initiated by the terminal device, and the authentication information for the second session or authorization information for the second session is still within a validity period. The operation is more flexible and applicability is better.

Optionally, the first authentication information for the first session that the terminal device requests to establish further includes a first security context used by the first session, and the second authentication information for the second session earlier initiated by the terminal device includes a second security context used by the second session. The first network device may obtain, from the local storage space, the second security context used by the second session, and when the second security context is the same as the first security context, directly authorize the terminal device to establish the first session with the first data network or start fast authentication and authorization based on same security context information. In this embodiment of this application, when the data network to which the new session requests to connect is the same as the data network to which the session earlier initiated by the terminal device is connected or when servers of the data networks are the same, security contexts are compared, so as to determine to directly perform authorization on the new session without authentication, or perform fast authentication based on the same security context. The operation is easier, and data processing efficiency of network security management is higher.

Optionally, in an implementation provided in this embodiment of this application, the first network device may update the second security context of the second session after authorizing the terminal device to establish the first session with the first data network, and instruct the terminal device to update a security context of the second session stored in the terminal device, thereby satisfying more security requirements of network security management, for example, a security requirement of preventing replay attacks.

Optionally, in an implementation provided in this embodiment of this application, when the first network device that serves as the identity authenticator does not store or has not stored information such as a security context of the session earlier initiated by the terminal device, a second network device may be queried for the information such as the security context of the session earlier initiated by the terminal device, and whether to perform authentication for the new session initiated by the terminal device may be further determined. This may specifically include: sending, by the first network device, a security context query request to the second network device, where the security context query request is used to query a security context of a session of the terminal device; and receiving, by the first network device, the second security context of the second session fed back by the second network device, where the second session is at least one of a plurality of sessions of the terminal device, and the security context of the second session is still within a validity period.

In this implementation provided in this embodiment of this application, the first network device may query the second network device for authentication information such as the security context of the session earlier initiated by the terminal device, and when the data network to which the new session requests to connect is the same as the data network to which the session earlier initiated by the terminal device is connected or when servers of the data networks are the same, may further compare security contexts to determine to directly perform authorization on the new session or perform fast authentication and authorization based on same security context information. Data obtaining manners are diverse, an authorization operation for session establishment is easier, and data processing efficiency of network security management is higher.

Optionally, the authentication information for the session of the terminal device includes at least one of the following: a terminal device subscription identifier ID on the operator network, a terminal device subscription ID on the first data network, an ID of a network device, to which the session is connected, of the operator network, a security context of the session, identifier information of a data network to which the session is connected, identifier information of an authentication server to which the session is connected, and a validity period of successful session authentication.

Optionally, at least one or two of the terminal device subscription ID on the operator network, the terminal device subscription ID on the first data network, and the security context of the session are used for authentication, fast authentication, or authorization on the terminal device.

Optionally, the authorizing the terminal device to establish the first session with the first data network includes:
  sending, by the first network device, a session authentication or authorization policy query request to the second network device; and
  receiving, by the first network device, a session authentication or authorization policy fed back by the second network device, and granting, according to the session authentication or authorization policy, the terminal device a privilege scope for establishing the first session with the first data network.

In this implementation provided in this embodiment of this application, the first network device that serves as the identity authenticator may query the second network device for the session authentication or authorization policy, and grant, according to the session authentication or authorization policy provided by the second network device, the terminal device the privilege scope for establishing the first session with the first data network.

Optionally, the method provided in this embodiment of this application further includes:

if the identifier information of the first data network is the same as the identifier information of the second data network, sending, by the first network device, a session authentication request to the authentication server of the first data network, where the session authentication request is used to instruct the authentication server to initiate fast authentication for the first session based on the second authentication information; and if a fast authentication success response message fed back by the authentication server is received, authorizing the terminal device to establish the first session with the first data network.

Optionally, after the receiving, by the first network device, a session request sent by a terminal device, the method further includes:

forwarding, by the first network device, the session request to the authentication server of the first data network, where the session request is used to trigger the authentication server to determine whether to perform fast authentication for the first session; and if the authentication server determines to perform fast authentication for the first session, receiving, by the first network device after the authentication server performs fast authentication for the first session, a fast authentication success response message fed back by the authentication server, and authorizing the terminal device to establish the first session with the first data network.

In this implementation of this embodiment of this application, the fast authentication for the first session may include the EAP re-authentication protocol ERP. In a system using EAP authentication, the terminal device and the authentication server perform a complete EAP authentication procedure by using an identity authenticator. When the terminal device moves from one identity authenticator to another identity authenticator (the authentication server of the data network is not changed), fast and secure switching between the identity authenticators can be implemented by using an ERP mechanism, without a need to perform another complete EAP authentication procedure. The ERP described in this embodiment of this application is not limited to one EAP authentication method, but a plurality of EAP authentication methods are supported.

Optionally, the fast authentication for the first session may include EAP Flexible Authentication via Secure Tunneling (EAP-FAST). The EAP-FAST protocol includes two stages. In stage one, a secure tunnel is established between the terminal device and the DN based on the transport layer security TLS protocol. In stage two, the secure tunnel is fast restored without a need to re-establish the secure tunnel, thereby implementing secure and fast connection establishment. With EAP-FAST applied herein, a $1^{st}$ secondary authentication on the terminal device is corresponding to stage one of EAP-FAST, and a $2^{nd}$ secondary authentication of the terminal device is corresponding to stage two.

Optionally, the foregoing fast authentication of secondary authentication may include other fast authentication protocols. No limitation is imposed herein.

The foregoing fast authentication method is usually used for fast authentication performed when switching is performed between physical authentication nodes. In this embodiment of this application, the foregoing fast authentication manner performed between physical authentication nodes may be used for fast authentication of secondary authentication between the terminal device and the DN. Implementations provided by the ERP and EAP-FAST fast authentication manners (for which, reference may be made to the IETF EAP protocols RFC 6696 and RFC 4851, respectively) are not limited herein.

Optionally, the foregoing fast authentication manners such as re-authentication may be initiated by the first network device, and the first network device sends a session authentication request to the authentication server of the data network, to trigger the authentication server to perform fast authentication and authorization such as re-authentication for the first session.

Optionally, the foregoing fast authentication manners such as re-authentication may alternatively be determined and/or initiated by the authentication server of the data network, without awareness of the first network device. The first network device may forward the session request to the authentication server, to trigger the authentication server to determine whether to perform fast authentication for the first session. When receiving a fast authentication success response message fed back by the authentication server, the first network device may authorize the terminal device to establish the first session with the first data network. Network security management provided in this embodiment of this application is adaptable to many scenarios. The operation is more flexible and applicability is better.

A second aspect provides a network security management method, which may be executed by a first network device serving as a data management network element on an operator network, the data management element may provide authentication information for sessions of a terminal device for a second network device serving as an identity authenticator on the operator network, and the method may include:

receiving, by the first network device, an authentication information query request sent by the second network device, where the authentication information query request includes identifier information of the terminal device and identifier information of a first data network to which a first session that the terminal device requests to establish is connected;

obtaining, by the first network device based on the identifier information of the terminal device and the identifier information of the first data network, authentication information for a second session of the terminal device for connecting to the first data network; and feeding back, by the first network device, the authentication information for the second session to the second network device, to trigger the second network device to authorize the terminal device to establish the first session with the first data network, where the second session is at least one of a plurality of sessions initiated by the terminal device for connecting to the first data network.

Optionally, the authentication information for the second session of the terminal device includes at least one of the following: a terminal device subscription identifier ID on the operator network, a terminal device subscription identifier ID on the first data network, an ID of a network device, to which the session is connected, of the operator network, a security context of the session, identifier information of a data network to which the session is connected, identifier information of an authentication server to which the session is connected, and a validity period of successful session authentication.

Optionally, at least one or two of the terminal device subscription identifier ID on the operator network, the terminal device subscription identifier ID on the first data network, and the security context of the session are used for authentication, fast authentication, or authorization on the terminal device.

Optionally, the authentication information query request further includes identifier information of the first data network; and
 the feeding back, by the first network device, authentication information for a session of the terminal device to the second network device includes:
 determining, by the first network device from a plurality of prestored sessions of the terminal device, a second session connected to the first data network, and feeding back authentication information for the second session to the second network device, where
 the second session is at least one of the plurality of sessions of the terminal device, and the authentication information or authorization information for the second session is still within a validity period.

Optionally, the method further includes:
 receiving, by the first network device, a session authentication or authorization policy query request sent by the second network device; and
 feeding back, by the first network device, a session authentication or authorization policy to the second network device, where
 the session authentication or authorization policy is used to instruct the second network device to grant the terminal device a privilege scope for establishing the first session with the first data network.

In the implementations provided in this embodiment of this application, the data management network element may store the authentication information for sessions initiated by the terminal device for connecting to data networks, and further when the identity authenticator needs to process a new session initiated by the terminal device, provides, to the identity authenticator, authentication information for a session earlier initiated by the terminal device, for the identity authenticator to determine whether authentication needs to be performed on the new session, or may directly authorize the terminal device to establish the new session with the data network. This diversifies session authentication processing manners in network security management and improves session processing efficiency of network security management. In the implementations provided in this embodiment of this application, the data management network element may further provide the session authentication or authorization policy to the identity authenticator. This can improve convenience in authentication or authorization on sessions of the terminal device, and applicability is better.

A third aspect provides a network device, where the network device is a first network device of an operator network, and the first network device includes:
 a transceiver unit, configured to receive a session request sent by a terminal device, where the session request is used to request establishment of a first session with a first data network, the session request includes first authentication information for the first session, and the first authentication information includes identifier information of the first data network; and
 a processing unit, configured to obtain second authentication information for a second session of the terminal device, where the second authentication information includes identifier information of a second data network to which the second session is connected; and the processing unit is further configured to: if the identifier information of the first data network is the same as the identifier information of the second data network, authorize the terminal device to establish the first session with the first data network.

Optionally, the first authentication information includes the identifier information of the first data network, and the second authentication information includes the identifier information of the second data network to which the second session is connected; and
 the processing unit is configured to:
 obtain the preset identifier information of the second data network; and if the identifier information of the first data network is the same as the identifier information of the second data network, authorize the terminal device to establish the first session with the first data network.

Optionally, that the identifier information of the first data network is the same as the identifier information of the second data network includes at least one of the following:
 a data network number DNN of the first data network is the same as a DNN of the second data network; or
 an authentication server of the first data network is the same as an authentication server of the second data network; or
 a synchronous authentication server group to which an authentication server of the first data network belongs is the same as a synchronous authentication server group to which an authentication server of the second data network belongs.

Optionally, the operator network further includes a second network device; and
 the transceiver unit is further configured to:
 send an authentication information query request to the second network device, where the authentication information query request is used to query authentication information for a session of the terminal device; and
 receive the second authentication information for the second session fed back by the second network device, and obtain the identifier information of the second data network from the second authentication information, where
 the second session is at least one of a plurality of sessions of the terminal device, and the second authentication information or the authentication or authorization information for the second session is still within a validity period.

Optionally, the first authentication information further includes a first security context used by the first session, and the second authentication information further includes a second security context used by the second session; and
 the processing unit is configured to:
 obtain the preset second security context; and if the second security context is the same as the first security context, authorize the terminal device to establish the first session with the data network.

Optionally, the processing unit is further configured to update the second security context; and
 the transceiver unit is further configured to instruct the terminal device to update a security context of the second session stored in the terminal device.

Optionally, the transceiver unit is further configured to send a security context query request to a second network device, where the security context query request is used to query a security context of a session of the terminal device; and the transceiver unit is further configured to receive the second security context of the second session fed back by the second network device, where the second session is at least one of a plurality of sessions of the terminal device, and the security context of the second session is still within a validity period.

Optionally, the transceiver unit is further configured to send a session authentication or authorization policy query request to the second network device;

the transceiver unit is further configured to receive a session authentication or authorization policy fed back by the second network device; and the processing unit is further configured to grant, according to the session authentication or authorization policy received by the transceiver unit, the terminal device a privilege scope for establishing the first session with the first data network.

Optionally, the transceiver unit is further configured to: when the identifier information of the first data network is the same as the identifier information of the second data network, send a session authentication request to an authentication server of the first data network, where the session authentication request is used to instruct the authentication server to initiate fast authentication for the first session based on the second authentication information; and the processing unit is further configured to: when the transceiver unit receives a fast authentication success response message fed back by the authentication server, authorize the terminal device to establish the first session with the first data network.

Optionally, the transceiver unit is further configured to forward the session request to an authentication server of the first data network, where the session request is used to trigger the authentication server to determine whether to perform fast authentication for the first session; and the processing unit is further configured to: when the transceiver unit receives a fast authentication success response message fed back by the authentication server, authorize the terminal device to establish the first session with the first data network.

A fourth aspect provides a network device, where the network device is a first network device on an operator network, the operator network further includes a second network device, and the first network device includes:

a transceiver unit, configured to receive an authentication information query request sent by the second network device, where the authentication information query request includes identifier information of the terminal device and identifier information of a first data network to which a first session that the terminal device requests to establish is connected; and a processing unit, configured to obtain, based on the identifier information of the terminal device and the identifier information of the first data network, authentication information for a second session of the terminal device for connecting to the first data network; and the transceiver unit is configured to feed back the authentication information for the second session to the second network device, to trigger the second network device to authorize the terminal device to establish the first session with the first data network, where the second session of the terminal device is at least one of a plurality of sessions initiated by the terminal device for connecting to the first data network.

Optionally, the authentication information for the second session of the terminal device further includes at least one of the following: a terminal device subscription identifier ID on the operator network, a terminal device subscription identifier ID on the first data network, an ID of a network device, to which the session is connected, of the operator network, a security context of the session, identifier information of a data network to which the session is connected, identifier information of an authentication server to which the session is connected, and a validity period of successful session authentication.

Optionally, the authentication information query request further includes identifier information of the first data network; and the network device further includes:

a processing unit, configured to determine, from a plurality of sessions of the terminal device prestored in the storage unit, a second session connected to the first data network, where the transceiver unit is configured to feed back authentication information for the second session determined by the processing unit to the second network device, where the second session is at least one of the plurality of sessions of the terminal device, and the authentication information or authorization information for the second session is still within a validity period.

Optionally, the storage unit is further configured to store a session authentication or authorization policy; and the transceiver unit is further configured to receive a session authentication or authorization policy query request sent by the second network device, and feed back the session authentication or authorization policy to the second network device, where the session authentication or authorization policy is used to instruct the second network device to grant the terminal device a privilege scope for establishing the first session with the first data network.

A fifth aspect provides a network security management system, where the system may include: the network device provided in the third aspect, the network device provided in the fourth aspect, a terminal device, and an authentication server of a data network, where the terminal device is configured to initiate a session request to an operator network, where the session request is used to request establishment of a first session with the data network; and the authentication server of the data network is configured to: determine whether to perform fast authentication for the first session, and/or perform fast authentication for the first session, and instruct the operator network to authorize the terminal device to establish the first session with the data network.

A sixth aspect provides a network device, where the network device may include a processor, a memory, a transceiver, and a bus system, where the memory, the processor, and the transceiver are connected by using the bus system;

the memory is configured to store a group of program code; and the processor and the transceiver are configured to invoke the program code stored in the memory to execute the method provided in the first aspect.

A seventh aspect provides a network device, where the network device may include a processor, a memory, a transceiver, and a bus system, where the memory, the processor, and the transceiver are connected by using the bus system;

the memory is configured to store a group of program code; and the processor and the transceiver are configured to invoke the program code stored in the memory to execute the method provided in the second aspect.

According to an eighth aspect, an embodiment of this application provides a computer storage medium, configured to store a computer software instruction for use by the network device provided in the third aspect. The computer software instruction includes a program designed for executing the method provided in the first aspect.

According to a ninth aspect, an embodiment of this application provides a computer storage medium, configured to store a computer software instruction for use by the network device provided in the fourth aspect. The computer software instruction includes a program designed for executing the method provided in the second aspect.

According to a tenth aspect, an embodiment of this application further provides a chip, and the chip is coupled to a transceiver in a network device and configured to execute the technical solution in the first aspect or the second aspect of the embodiments of this application. It should be understood that in this embodiment of this application, "coupling" means that two components are joined directly or indirectly to each other. This joint may be fixed or movable. This joint may allow a flowing liquid, electricity, an electrical signal, or another type of signal to communicate across the two components.

By implementing the embodiments of this application, efficiency of terminal device authentication can be improved, resource consumption of terminal device authentication can be reduced, and applicability of network security management can be enhanced.

DESCRIPTION OF EMBODIMENTS

An operator network described in the embodiments of this application may be referred to as a mobile communications network, mainly a network on which a mobile network operator (MNO) provides a mobile broadband access service to users. The operator network described in the embodiments of this application may be specifically a network compliant with a specification of the 3rd Generation Partnership Project (3GPP), a 3GPP network for short. Generally, a 3GPP network is operated by an operator such as China Mobile, China Unicom, or China Telecom. The 3GPP network includes but is not limited to 5G networks, 4G networks, and 3rd generation mobile communication technology (3G) networks that are defined by 3GPP specifications, and second generation wireless telephone technology (2G) networks. For ease of description, the following description of the embodiments of this application uses an operator network as an example.

Figure 1:
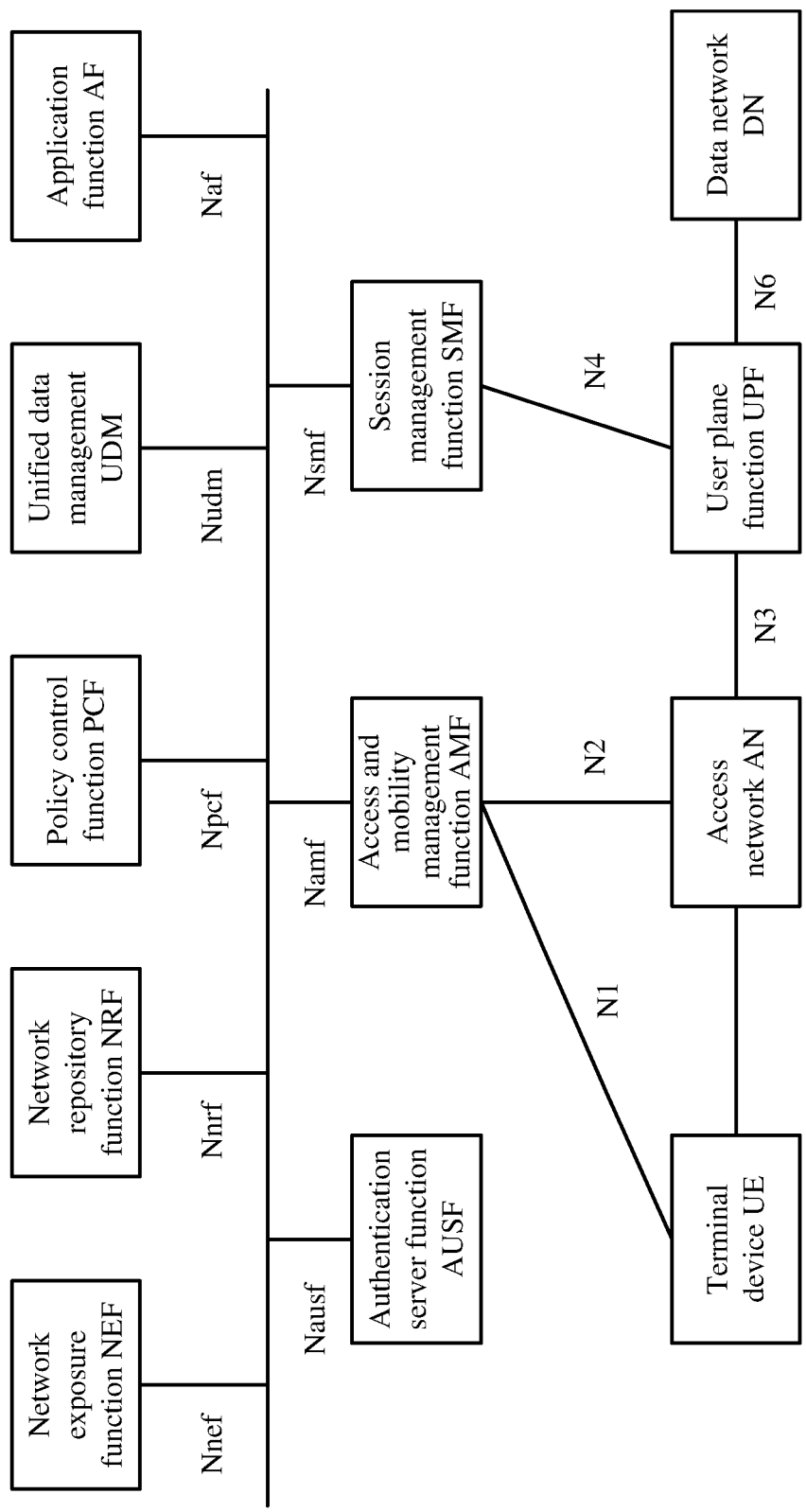
FIG. 1 is a schematic diagram of a 5G network architecture based on a service-oriented architecture according to an embodiment of this application.

Expansion of the mobile broadband access service is accompanied by development of MNO networks, so as to better support diversified business models, and satisfy requirements of more diversified application services and more industries. To provide better and more comprehensive services to more industries, the next generation networks (that is, 5G networks) also come with network architecture adjustment from 4G networks. For example, in a 5G network, a mobility management entity (MME) in a 4G network is divided into a plurality of network elements including an access and mobility management function (AMF) and a session management function (SMF). In a 3GPP standardization process, a 5G network architecture based on a service-oriented architecture is also defined, as shown in FIG. 1. FIG. 1 is a schematic diagram of the 5G network architecture based on the service-oriented architecture. The 5G network architecture shown in FIG. 1 may include three parts: a terminal device part, a DN part, and an operator network part. The operator network may include network elements and/or entities such as a network exposure function (NEF), a network repository function (NRF), a policy control function (PCF), a unified data management network element (UDM), an application function (AF), an authentication server function (AUSF), an AMF, an SMF, an access network (AN), and a user plane function (UPF). The AN is also referred to as a radio access network (RAN). No limitation is imposed herein. For ease of description, the following description of the embodiments of this application uses the AN as an example.

The 5G network architecture shown in FIG. 1 is only a possible architecture diagram of a 5G network. Network elements and/entities included in the 5G network include but are not limited to the network elements and/or entities shown in FIG. 1. In specific implementation, the network elements and/or entities included in the network architecture shown in FIG. 1 may alternatively be network elements and/or entities in other expression forms. The specific forms may be determined depending on actual application scenarios. No limitation is imposed herein.

The following describes each of network elements and/or entities included in the embodiments of this application with reference to FIG. 1.

a. The terminal device is, for example, a user equipment (UE). The terminal device in this application may be a device providing voice and/or data connectivity to a user, and may include a wireless terminal and a wired terminal. The wireless terminal may be a handheld device provided with a wireless connection function, or another processing device connected to a wireless modem, and may be a mobile terminal that communicates with one or more core networks by using a radio access network. For example, the wireless terminal may be a mobile phone, a computer, a tablet computer, a personal digital assistant (PDA), a mobile Internet device (MID), a wearable device, an e-book reader, or the like. For another example, the wireless terminal may alternatively be a portable mobile device, a pocket-sized mobile device, a handheld mobile device, a computer built-in mobile device, or an in-vehicle mobile device. For another example, the wireless terminal may be a mobile station or an access point. UE is a type of terminal device and a name of the terminal device in a Long Term Evolution (LTE) system.

The terminal device may establish a connection to the operator network by using an interface (for example, N1) provided by the operator network, to use, for example, data and/or voice services provided by the operator network. The terminal device may further access a DN via the operator network, to use an operator service deployed on the DN and/or a service provided by a third party. The third party may be a service provider other than the operator network and the terminal device, and may provide, for example, other data and/or voice services to the terminal device. A specific expression form of the third party may be specifically determined depending on actual application scenarios. No limitation is imposed herein.

b. The AN is a subnetwork of the operator network and an implementation system between a service node on the operator network and the terminal device. To connect to the operator network, the terminal device first connects to the AN and then may be connected to the service node of the operator network by using the AN. The AN may partially or completely substitute for a traditional subscriber local line network and may include multiplexing, cross-connect, and transmission functions. The AN is a subnetwork that is capable of connecting various subscribers to the service node of the operator network and supporting comprehensive access of various types of services including narrowband and wideband services.

c. The AMF is a control plane network element provided by the operator network and is in charge of access control and mobility management for access of terminal devices to the operator network.

d. The SMF is a control plane network element provided by the operator network and is responsible for managing PDU sessions of terminal devices. A PDU session is a channel used for PDU transmission. The terminal device relies on the PDU session to exchange PDUs with the DN. The SMF is in charge of, for example, establishment, maintenance, and deletion of PDU sessions.

e. The DN is also referred to as a packet data network (PDN) and is a network located outside the operator network. The operator network may be connected to a plurality of DNs. A plurality of services may be deployed on the DN, to provide, for example, data and/or voice services to terminal devices. For example, the DN is a private network of an intelligent factory, a sensor installed in a workshop by the intelligent factory may be a terminal device, a control server of the sensor is deployed on the DN, and the control server may provide a service for the sensor. The sensor may communicate with the control server to, for example, obtain an instruction of the control server and transmit collected sensor data to the control server based on the instruction. For another example, the DN is an internal office network of a company, mobile phones or computers of employees of the company may be terminal devices, and the mobile phones or computers of the employees can access information, data, and other resources on the internal office network of the company.

f. The UDM is a control plane network element provided by the operator and is responsible for storing information about subscribers of the operator network, such as subscriber permanent identifiers (SUPI), credentials, security contexts, and subscription data. The information stored by the UDM may be used for authentication and authorization of the terminal device for access to the operator network. The subscriber of the operator network may be specifically a subscriber using a service provided by the operator network, for example, a subscriber using a mobile phone chip card of China Telecom or a subscriber using a mobile phone chip card of China Mobile. The SUPI of the subscriber may be, for example, a number of the mobile phone chip card. The credential and the security context of the subscriber may be a small file storing, for example, an encryption key of the mobile phone chip card or information related to encryption of the mobile phone chip card, and is used for authentication and/or authorization. The security context may be a cookie, a token, or the like stored on a local terminal (for example, a mobile phone) of the subscriber. The subscription data of the subscriber may be a service accompanying the mobile phone chip card, for example, a traffic package for or a network for use by the mobile phone chip card. It should be noted that for ease of description, the information related to authentication and authorization such as the permanent identifier, the credential, the security context, the authentication cookie, and the token are not differentiated or limited in this application of the present disclosure. In the embodiments of this application, the security context is used as an example for description, unless otherwise specified. However, the embodiments of this application are also applicable to authentication and/or authorization information expressed in other ways.

g. The AUSF is a control plane network element provided by the operator and is usually used for primary authentication, that is, authentication between terminal devices (subscribers) and the operator network. After receiving an authentication request initiated by a subscriber, the AUSF may perform authentication and/or authorization on the subscriber by using authentication information and/or authorization information stored in the UDM, or generate authentication and/or authorization information of the subscriber by using the UDM. The AUSF may feed back the authentication information and/or the authorization information to the subscriber.

h. The NEF is a control plane network element provided by the operator. The NEF exposes an external interface of the operator network to a third party in a secure manner. When a network element such as the SMF needs to communicate with a network element of the third party, the NEF may serve as a relay for communication between the network element such as the SMF and the network element of the third party. When serving as the relay, the NEF may serve as a translator of identifier information of the subscriber and a translator of identifier information of the network element of the third party. For example, when sending an SUPI of the subscriber to the third party from the operator network, the NEF may translate the SUPI into an external identity (ID) corresponding to the SUPI. Conversely, when sending an external ID (an ID of the network element of the third party) to the operator network, the NEF may translate the external ID into an SUPI.

i. The UPF is a gateway provided by the operator and a gateway for communication between the operator network and the DN.

j. The PCF is a control plane function provided by the operator, for providing PDU session policies to the SMF.

The policies may include, for example, a charging-related policy, a quality of service (QoS)-related policy, and an authorization-related policy.

In FIG. 1, Nnef, Nausf, Nnrf, Npcf, Nudm, Naf, Namf, Nsmf, N1, N2, N3, N4, and N6 are interface serial numbers. For meanings of these interface serial numbers, refer to definitions in 3GPP specifications. No limitation is imposed herein.

Secondary authentication described in the embodiments of this application may also be referred to as secondary authentication. For ease of description, the embodiments of this application are described by using secondary authentication as an example in the following.

In specific implementation, after primary authentication (also referred to as primary authentication) between the terminal device and the operator network succeeds, if the terminal device needs to establish a session (for example, a PDU session) with a DN, secondary authentication may be performed between the terminal device and the DN via the operator network. Establishment of a PDU session may be triggered by the terminal device or a core network (CN) of the operator network, and authentication is initiated by the CN of the operator network. Specifically, the terminal device may send an authentication request to the operator network, the operator network may forward the authentication request to the DN, and the DN performs authentication and/or authorization between the DN and the terminal device by using an authentication server corresponding to the DN. The authentication server corresponding to the DN may be an authentication, authorization, and accounting server (AAA server). A result of authentication and/or authorization performed on the terminal device by the authentication server corresponding to the DN is fed back to the operator network by the DN, and the operator network determines, based on the result, whether to establish a corresponding session connection for the terminal device.

Figure 2A:
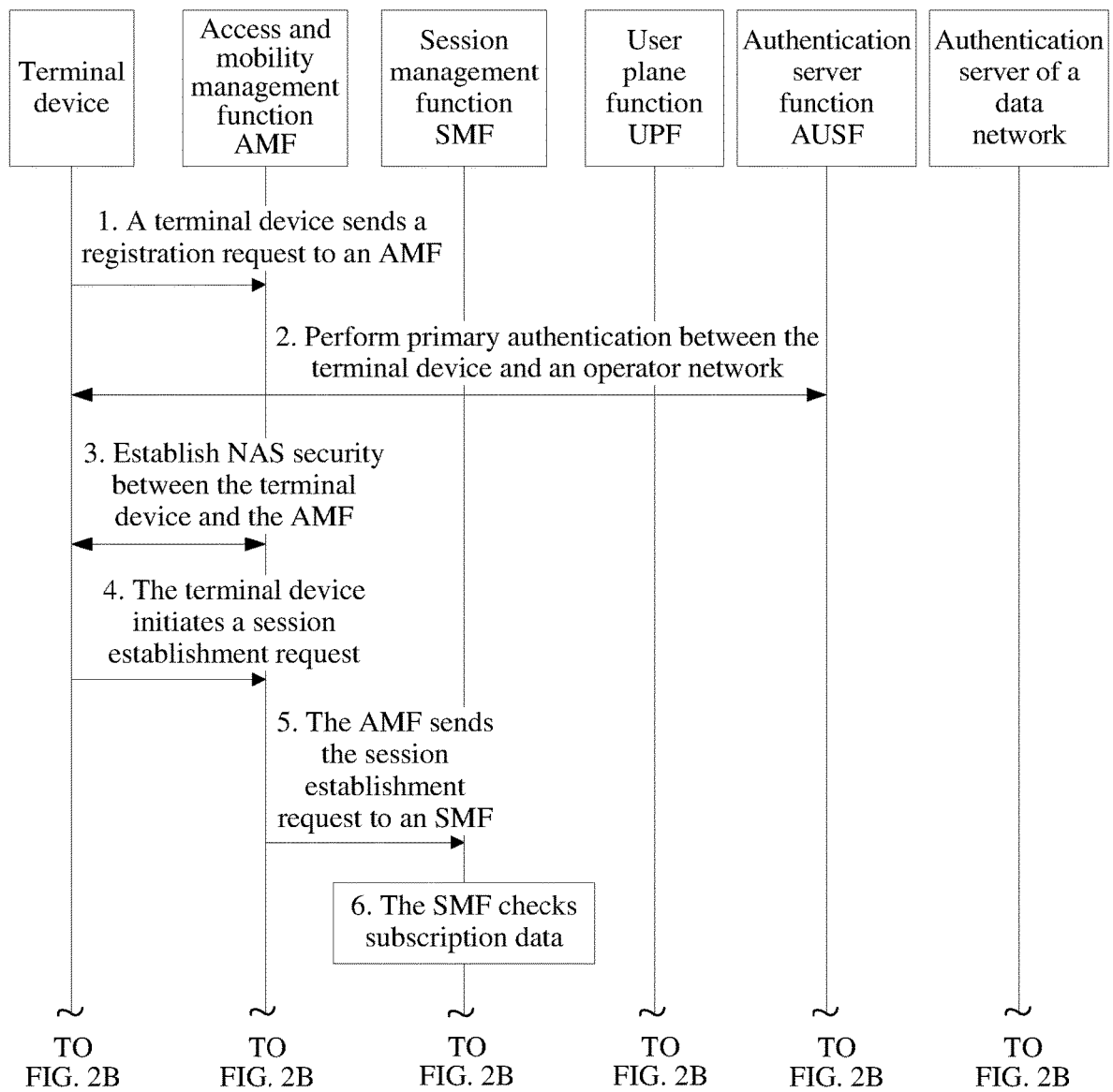
FIG. 2A and FIG. 2B are a schematic diagram of authentication interaction of secondary authentication according to an embodiment of this application.
Figure 2B:
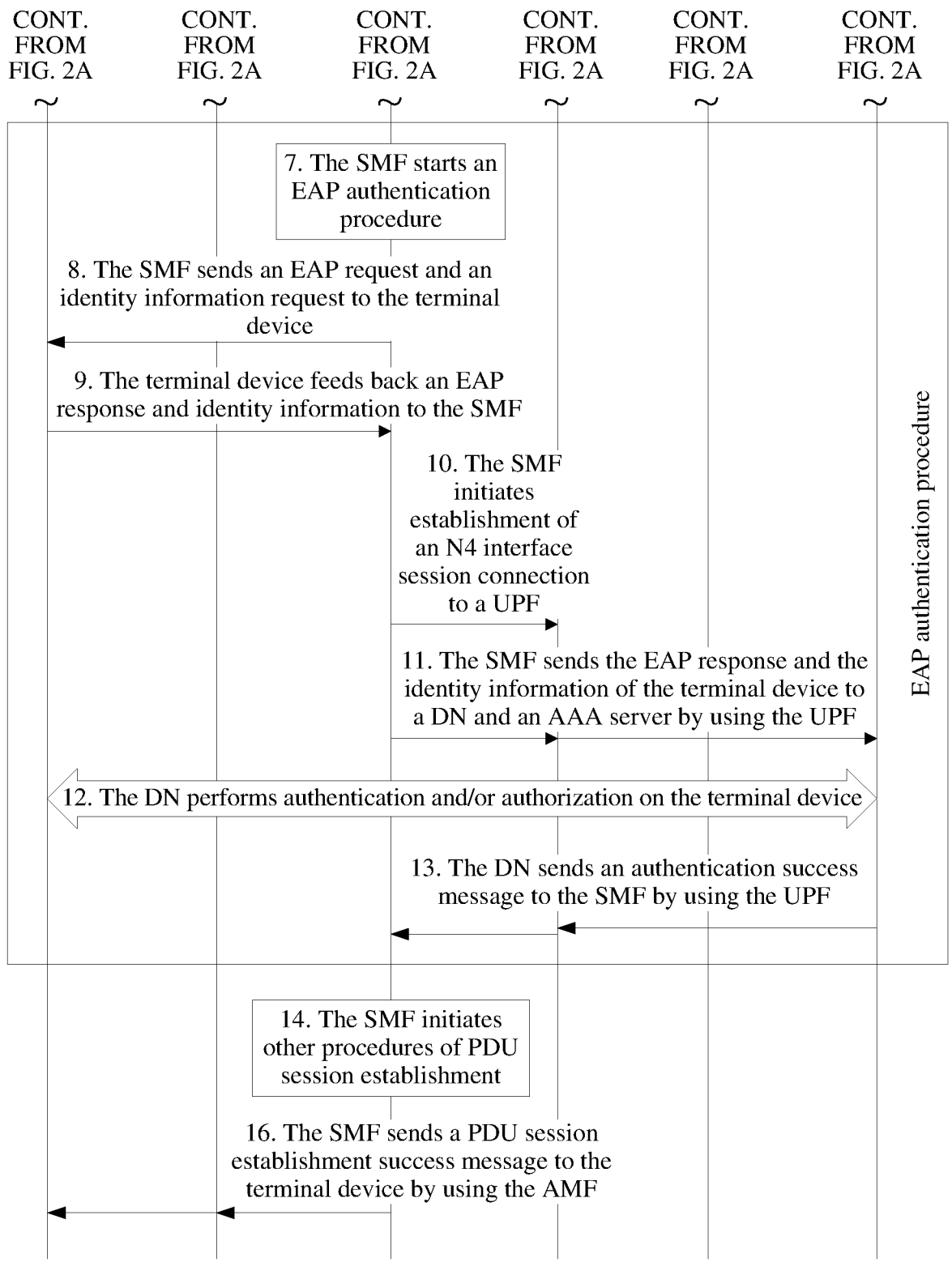

Secondary authentication has currently been accepted as an optional authentication mechanism for authentication between a terminal device and a DN outside the operator network in 3GPP 5G specifications (TS 23.502 and TS 33.501). FIG. 2A and FIG. 2B are a schematic diagram of authentication interaction of secondary authentication according to an embodiment of this application. Steps included in the schematic diagram of authentication interaction shown in FIG. 2A and FIG. 2B and implementations described for the steps are merely an example. In specific implementation, the steps and/or network elements shown in FIG. 2A and FIG. 2B may be, for example, added, deleted, or modified, depending on requirements of actual application scenarios. No limitation is imposed herein. The secondary authentication interaction process shown in FIG. 2A and FIG. 2B may include the following steps.

1. A terminal device sends a registration request to an AMF.

2. Perform primary authentication between the terminal device and an operator network.

In specific implementation, after receiving the registration request sent by the terminal device, the AMF may trigger an AUSF to perform primary authentication between the terminal device and the operator network.

Optionally, in a process in which the AUSF performs primary authentication between the terminal device and the operator network, the AUSF may obtain authentication information required for primary authentication from a UDM, and may further implement primary authentication between the terminal device and the operator network based on authentication information generated or stored by the UDM.

3. Establish non-access stratum (NAS) security between the terminal device and the AMF.

In specific implementation, after primary authentication between the terminal device and the operator network succeeds, the AMF may establish the NAS security with the terminal device. A NAS exists in a wireless communications protocol stack of a Universal Mobile Telecommunications System (UMTS), and serves as a functional layer between the CN and the terminal device. The NAS supports signaling and/or data transmission between a CN and the terminal device.

4. The terminal device initiates a session establishment request.

After the NAS is established between the terminal device and the AMF, the terminal device may initiate the session establishment request to the AMF. The session establishment request is embedded into a NAS message and sent to the AMF. The session establishment request may be specifically used to request establishment of a PDU session.

5. The AMF sends the session establishment request to an SMF.

After receiving the NAS message sent by the terminal device, the AMF may decode the NAS message to obtain the session establishment request, and then send the session establishment request to the SMF. The SMF is an SMF to which the PDU session of which establishment is requested by the session establishment request requests to connect.

6. The SMF checks subscription data.

After receiving the session establishment request, the SMF obtains authentication information carried in the session establishment request. The SMF obtains subscription data prestored in the UDM, and may further check, based on the subscription data stored in the UDM, whether the authentication information carried in the session establishment request is the same as the subscription data. If a result of the check is that the authentication information is the same as the subscription data, step 7 may be performed.

7. The SMF starts an Extensible Authentication Protocol (EAP) authentication procedure.

8. The SMF sends an EAP request and an identity information request to the terminal device.

9. The terminal device feeds back an EAP response and identity information to the SMF.

10. The SMF initiates establishment of an N4 interface session connection to a UPF.

11. The SMF sends the EAP response and the identity information of the terminal device to a DN and an AAA server by using the UPF.

The SMF sends, to the UPF through the N4 interface session connection established in step 10, the EAP response and authentication information sent from the terminal device. The UPF sends the EAP response and the identity information of the terminal device to the DN and the AAA server.

12. The DN performs authentication and/or authorization on the terminal device.

The terminal device exchanges with the DN (and the AAA server) a plurality of EAP messages, to complete authentication on the terminal device by the DN.

Details such as message types of the EAP messages exchanged or an interaction manner between the terminal device and the DN depend on a specific EAP authentication method used. No limitation is imposed herein.

13. The DN sends an authentication success message to the SMF by using the UPF.

If the terminal device has been authenticated by the DN, the DN sends the authentication success message to the UPF and sends the authentication success message to the SMF by using the UPF and the N4 interface session connection.

14. The SMF initiates other procedures of PDU session establishment.

After EAP authentication on the terminal device by the DN ends, the SMF may continue to initiate the other procedures of PDU session establishment. For example:

15a. The SMF sends an N4 interface session modification request to the UPF.

15b. The UPF feeds back an N4 interface session modification response to the SMF.

16. The SMF sends a PDU session establishment success message to the terminal device by using the AMF.

The SMF sends the PDU session establishment success message to the AMF, and the AMF forwards the PDU session establishment success message to the terminal device.

The authentication procedure described in steps 1 to 16 is a secondary authentication procedure provided in 3GPP TS 33.501, also referred to as a regular procedure of secondary authentication.

Authentication message exchanged between the terminal device and the AAA server is based on an EAP authentication framework. The EAP authentication framework is open in terms of authentication. The EAP authentication framework supports negotiation of an authentication method, and can support tens of authentication methods and extensions to more authentication methods in the future. In an authentication mechanism provided by EAP, a role of an identity authenticator (Authenticator) is defined. In the authentication procedure of secondary authentication shown in FIG. 2A and FIG. 2B, the SMF serves as an identity authenticator. EAP messages between the terminal device and the SMF are carried in NAS messages. EAP messages between the SMF and the DN are transferred by using an N4 interface between the SMF and the UPF and an N6 interface between the UPF and the DN defined in 3GPP specifications.

It can be learned from the authentication procedure described in steps 1 to 16 that in the regular procedure of secondary authentication, secondary authentication is performed on a per PDU session basis, and each time the terminal device needs to establish a PDU session with a DN, secondary authentication in the foregoing procedure needs to be performed. If the terminal device needs to establish a plurality of PDU sessions with a DN, the terminal device needs to perform a plurality of secondary authentication procedures with the DN.

A trust relationship between one terminal device and one DN is usually unchanged, and therefore a plurality of similar authentication procedures performed cause a serious waste of network resources (for example, radio spectrum resources or a network transmission capacity) and/or terminal resources (for example, computation workload or an electric capacity). Each authentication procedure consumes a relatively long time, causing an unnecessary latency. Consequently, efficiency of terminal device authentication is low and an unnecessary latency results. Similarly, in an application scenario in which one terminal device establishes PDU sessions with different DNs, if the different DNs use a same authentication server (for example, an AAA server), repeating secondary authentication for a plurality of times between the terminal device and the different DNs also causes an unnecessary waste of resources, prolongs a latency, and reduces authentication efficiency for the PDU sessions.

The embodiments of this application provide a network security management method and an apparatus, so that in an application scenario in which secondary authentication is performed for a plurality of times between one terminal device and one DN (or one authentication server, or the like), fast authentication and/or authorization is performed for other secondary authentications between the terminal device and the DN after a $1^{st}$ secondary authentication. This can improve efficiency of terminal device authentication and reduce resource consumption of terminal device authentication.

In 3GPP TS 23.501 that is currently being standardized, it is clearly emphasized that the following PDU session scenarios are supported:

1. One terminal device may establish a plurality of PDU sessions simultaneously, and these PDU sessions may be connected to a same DN or different DNs.

2. One terminal device may be connected to one or more network slices. When one terminal device is connected to a plurality of network slices, a core network element in charge of access is a common AMF.

The network security management method provided in the embodiments of this application may be applicable to an application scenario in which a terminal device establishes two or more PDU sessions. For ease of description, the following description of the embodiments of this application uses two PDU sessions as an example. The two PDU sessions may be sessions established simultaneously or may be sessions established at different times.

The two PDU sessions may be classified based on a network slice-related scenario into mainly the following two categories.

Category 1: The two PDU sessions belong to a same network slice.

Figure 3:
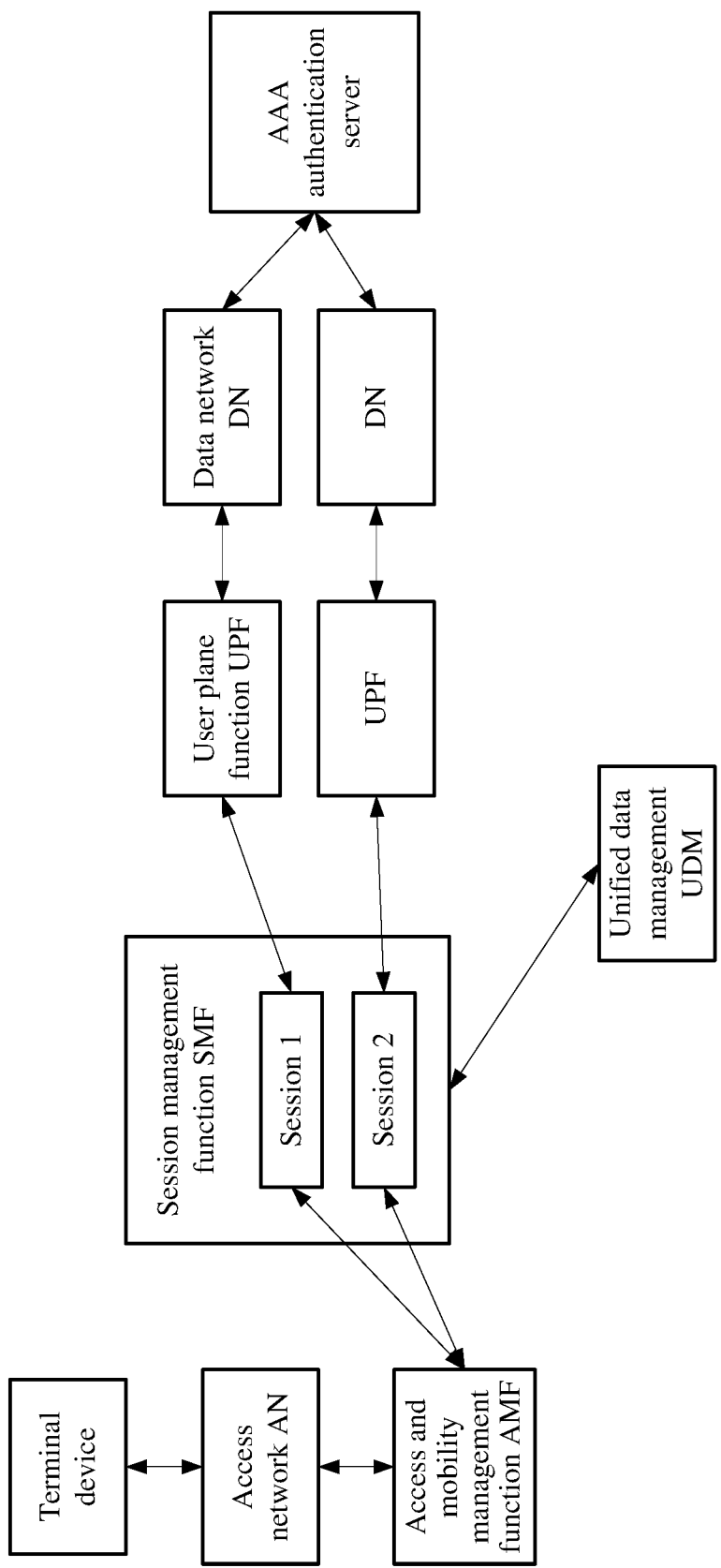
FIG. 3 is a schematic diagram of sessions of a terminal device according to an embodiment of this application.

FIG. 3 is a schematic diagram of sessions of a terminal device according to an embodiment of this application. As shown in FIG. 3, a network slice 1 includes two PDU sessions: a session 1 (Session 1) and a session 2 (Session 2). Both the session 1 and the session 2 are managed and/or controlled by an SMF of the network slice 1.

Optionally, that the session 1 and the session 2 belong to a same network slice may also be specifically manifested as that the session 1 and the session 2 belong to a same SMF. This may be specifically marked by information such as network slice selection assistance information (NSSAI) or a network slice ID. Details may be determined depending on actual application scenarios, and no limitation is imposed herein.

Establishment of the session 1 and the session 2 are initiated by a terminal device. The session 1 and the session 2 pass through an AN and an AMF and arrive at the SMF. After being managed and/or controlled by the SMF, the session 1 and the session 2 may be connected, by using their respective UPFs and respective DNs they request to connect, to a same AAA server for authentication.

Optionally, in the application scenario shown in FIG. 3, the session 1 and the session 2 may also share a same UPF. Similarly, regardless of whether the session 1 and the session 2 share a same UPF, the session 1 and the session 2 can share a same DN. Similarly, the session 1 and the session 2 may also be connected to different AAA servers. However, in the application scenario, two different AAA servers connected to the session 1 and the session 2 need to be two synchronous servers, or need to be two AAA servers of one authentication server group.

Category 2: The two PDU sessions are sessions of two different network slices.

Figure 4:
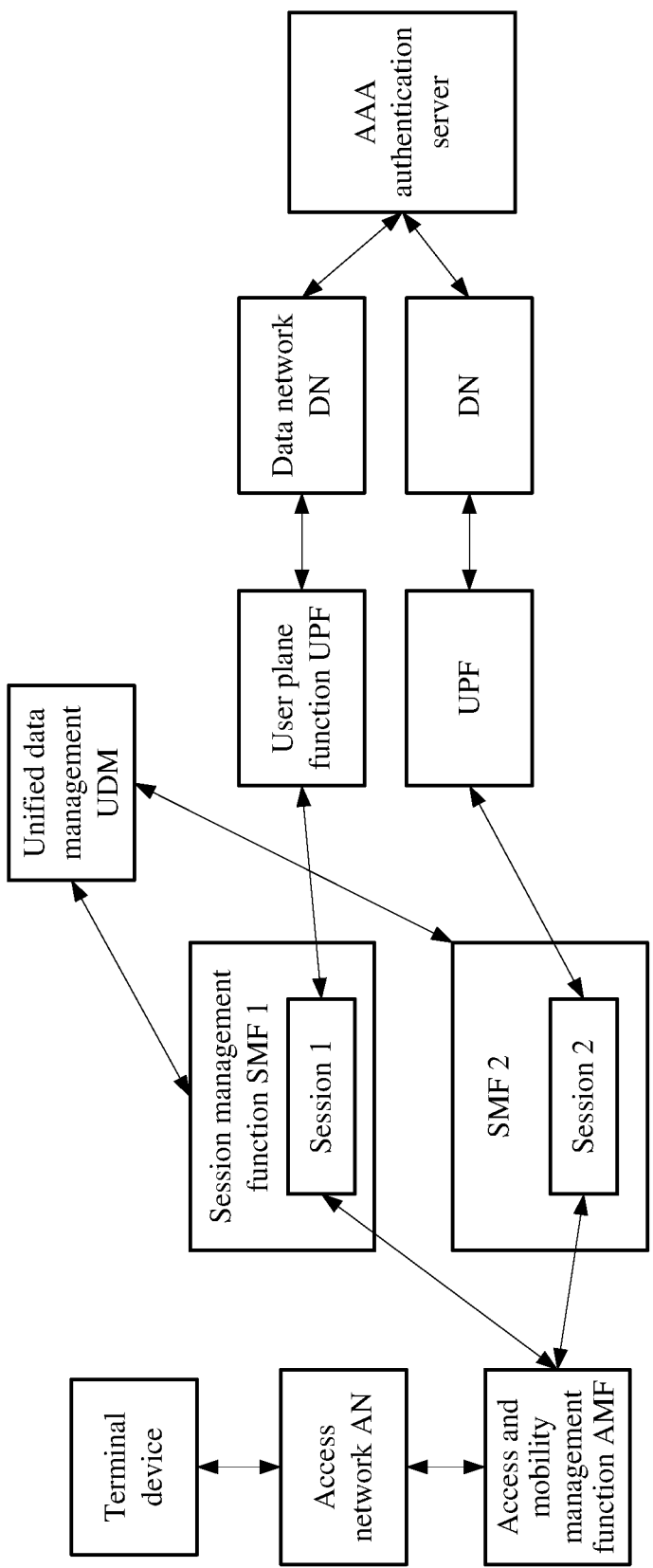
FIG. 4 is another schematic diagram of sessions of a terminal device according to an embodiment of this application.

FIG. 4 is another schematic diagram of sessions of a terminal device according to an embodiment of this application. As shown in FIG. 4, a terminal device initiates two sessions to an operator network: a session 1 and a session 2. Different from the scenario shown in FIG. 3, in the scenario shown in FIG. 4, the session 1 and the session 2 belong to two different network slices of the operator network. The session 1 is connected to a network slice 1 and managed and/or controlled by an SMF 1 of the network slice 1. The session 2 is connected to a network slice 2 and managed and/or controlled by an SMF 2 of the network slice 2.

Optionally, authentication information for the session 1 and authentication information for the session 2 may both be stored and/or managed by a UDM on the operator network. The SMF 1 may store the authentication information for the session 1 in local storage space or may obtain, by querying the UDM, the authentication information for the session 1. The SMF 1 may also obtain, by querying the UDM, the authentication information for the session 2, and may further determine, based on the authentication information for the session 1 and the authentication information for the session 2, whether to perform fast authentication for the session 1. Similarly, the SMF 2 may store the authentication information for the session 2 in local storage space or may obtain, by querying the UDM, the authentication information for the session 2. The SMF 2 may also obtain, by querying the UDM, the authentication information for the session 1, and may further determine, based on the authentication information for the session 1 and the authentication information for the session 2, whether to perform fast authentication for the session 2.

Optionally, in the application scenario shown in FIG. 4, the session 1 and the session 2 may also share a same UPF. Similarly, regardless of whether the session 1 and the session 2 share a same UPF, the session 1 and the session 2 can share a same DN. Similarly, the session 1 and the session 2 may also be connected to different AAA servers. However, in the application scenario, two different AAA servers connected to the session 1 and the session 2 need to be two synchronous servers, or need to be two AAA servers of one authentication server group.

Optionally, the foregoing PDU session classification is applicable to network slice-related scenarios and is also applicable to PDU session classification in non-network slice scenarios. For example, the foregoing PDU session classification may alternatively be based on a UPF-related scenario, in which a UPF stores and/or manages authentication information for PDU sessions, and the UPF determines whether to perform fast authentication for a PDU session. Alternatively, the foregoing PDU session classification may be based on a DN-related scenario, in which a DN stores and/or manages authentication information for PDU sessions, and the DN determines whether to perform fast authentication for a PDU session.

The following describes the network security management method and the apparatus provided in the embodiments of this application by using an application scenario in which an SMF serves as an identity authenticator as an example.

Embodiment 1

An implementation described in Embodiment 1 may be applicable to the foregoing category 1 of PDU sessions. The following describes an implementation of secondary authentication in an application scenario corresponding to the foregoing category 1 of PDU sessions with reference to FIG. 5 and FIG. 6A and FIG. 6B.

Figure 5:
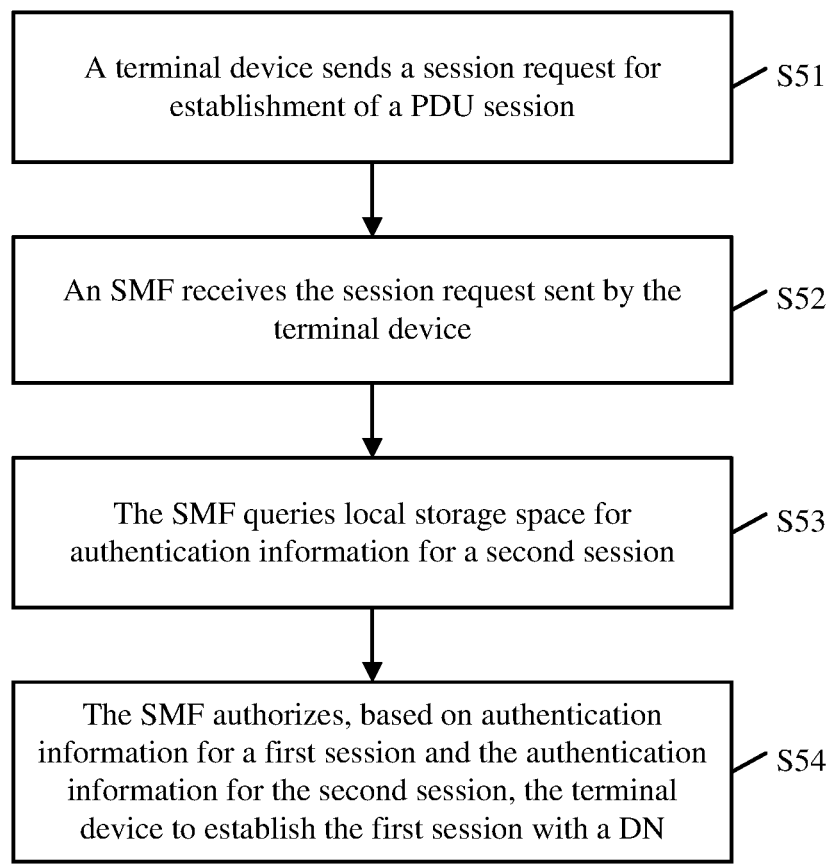
FIG. 5 is a schematic flowchart of a network security management method according to an embodiment of this application.

FIG. 5 is a schematic flowchart of a network security management method according to an embodiment of this application. The method provided in this embodiment of this application includes the following steps.

S51. A terminal device sends a session request for establishment of a PDU session.

Optionally, when the terminal device intends to access a service on a DN (for example, a DN 1), the terminal device may initiate a request for establishment of a session with the DN. The terminal device may send a session request to an AMF, to request establishment of a PDU session with the DN 1. In the following, the PDU session is assumed to be a session 1.

Optionally, the session request may include authentication information for the session 1. The authentication information may include a terminal device ID, a terminal device subscription ID on an operator network, a terminal device subscription ID on a first data network, a security context, subscription data, identifier information of the DN, and the like. The implementation provided in this embodiment of this application is applicable to secondary authentication for a second session and other sessions after the second session when one terminal device initiates a plurality of sessions. The operator network may determine, based on information carried in a session such as a terminal device ID, a terminal device initiating the session, and may further determine that the session is a $1^{st}$ session, a $2^{nd}$ session, a $3^{rd}$ session, or the like initiated by the terminal device.

Optionally, at least one or two of the terminal device subscription ID on the operator network, the terminal device subscription ID on the first data network, and the security context of the session are used for authentication, fast authentication, or authorization on the terminal device.

Optionally, after receiving the session request sent by the terminal device, the AMF may forward the session request to a network element such as an SMF or a UPF. For ease of description, the following description of this embodiment of this application uses the SMF as an example.

S52. An SMF receives the session request sent by the terminal device.

Optionally, after receiving the session request forwarded by the AMF, the SMF may first determine, based on the authentication information carried in the session request, whether the terminal device initiating the session request has performed secondary authentication with the DN 1.

Optionally, the SMF may determine, by searching local storage space of the SMF, whether authentication information for a session of the terminal device is included. If the local storage space of the SMF does not include authentication information for any session of the terminal device, it may be determined that the session 1 is a $1^{st}$ session initiated by the terminal device to the SMF. The SMF may initiate, based on information carried in the session request, a regular procedure of secondary authentication for the session 1, that is, the authentication procedure shown in FIG. 2A and FIG. 2B.

Optionally, after secondary authentication of each session of the terminal device succeeds, the SMF may store authentication information for the session in the local storage space of the SMF. Further, when new session requests are received, whether they are for a plurality of secondary authentications with a same DN may be determined through comparison of authentication information for sessions. If the sessions are a plurality of sessions between one terminal device and one DN, a fast authentication manner may be used for all other sessions after the $1^{st}$ session.

S53. The SMF queries local storage space for authentication information for a second session.

Optionally, if the SMF determines that the session 1 initiated by the terminal device is not a $1^{st}$ PDU session that connects the terminal device and the DN 1, the SMF may query the local storage space for authentication information for another session initiated by the terminal device to the SMF before this (which may be referred to as an earlier session).

The SMF may select the second session from a plurality of earlier sessions based on found authentication information for the plurality of earlier sessions, and determine, based on the authentication information for the second session, whether to perform fast authentication and/or authorization on the session 1. The authentication information for the earlier session may include the terminal device ID, a DN number (DNN), an AAA server identifier, an expiration date of successful authentication (or a validity period), and the like. The SMF may select, from the plurality of earlier sessions based on an expiration date of successful authentication of each session, a session whose expiration date of successful authentication has not arrived as the second session (which may be assumed to be a session 2). In other words, successful authentication of the session 2 is still within a validity period.

S54. The SMF authorizes, based on authentication information for a first session and the authentication information for the second session, the terminal device to establish the first session with a DN.

Optionally, if a DNN included in the authentication information for the session 1 is the same as DN identifier information included in the authentication information for the session 2, the terminal device may be directly authorized to establish the session 1 with the DN 1 or perform fast authentication of secondary authentication for the session 1.

Optionally, the DN identifier information may include a DNN, an identifier of an authentication server (for example, an AAA server) corresponding to the DN, a synchronous authentication server group to which an authentication server corresponding to the DN belongs, and the like. In specific implementation, a specific expression form of the DN identifier information may be determined depending on requirements of actual application scenarios. No limitation is imposed herein.

Optionally, the SMF may obtain a security context of the session 2 from the local storage space of the SMF, and if a security context of the to-be-established session 1 is the same as the security context of the session 2, the SMF may directly authorize the terminal device to establish the session 1 with the DN.

Optionally, the SMF may update the authentication information for the session 2 based on information stored in the local storage space of the SMF such as the security context of the session 2 and based on a security requirement such as a security requirement of preventing replay attacks, and instruct the terminal device to update authentication information, such as a security context, for the session 2 stored in the terminal device, for use for secondary authentication for a session requested by a session request subsequently initiated by the terminal device.

Optionally, the foregoing fast authentication of secondary authentication may include the EAP re-authentication protocol (ERP). In a system using EAP authentication, the terminal device and the authentication server perform a complete EAP authentication procedure by using an identity authenticator. When the terminal device moves from one identity authenticator to another identity authenticator (the authentication server is not changed), fast and secure switching between the identity authenticators can be implemented by using an ERP mechanism, without a need to perform another complete EAP authentication procedure. In this embodiment of this application, a $1^{st}$ secondary authentication is corresponding to complete EAP authentication, and a $2^{nd}$ secondary authentication is corresponding to a fast ERP re-authentication procedure. It should be noted that ERP is not limited to one EAP authentication method, but a plurality of EAP authentication methods are supported.

Optionally, the foregoing fast authentication of secondary authentication may include EAP Flexible Authentication via Secure Tunneling (EAP-FAST). The EAP-FAST protocol includes two stages. In stage one, a secure tunnel is established between the terminal device and the DN based on the transport layer security (TLS) protocol. In stage two, the secure tunnel is fast restored without a need to re-establish the secure tunnel, thereby implementing secure and fast connection establishment. With EAP-FAST applied herein, a $1^{st}$ secondary authentication is corresponding to stage one of EAP-FAST, and a $2^{nd}$ secondary authentication is corresponding to stage two.

Optionally, the foregoing fast authentication of secondary authentication may include other fast authentication protocols. No limitation is imposed herein.

The foregoing fast authentication method is usually used for fast authentication performed when switching is performed between physical authentication nodes. In this embodiment of this application, the foregoing fast authentication manner performed between physical authentication nodes may be used for fast authentication of secondary authentication between the terminal device and the DN. Implementations provided by the ERP and EAP-FAST fast authentication manners (for which, reference may be made to the IETF EAP protocols RFC 6696 and RFC 4851, respectively) are not limited herein.

Optionally, the foregoing fast authentication manners such as re-authentication may be initiated by the SMF, and the SMF sends a session authentication request to the AAA server, to trigger the AAA server to perform fast authentication and authorization such as re-authentication for the session 1.

Optionally, the foregoing fast authentication manners such as re-authentication may alternatively be determined and/or initiated by the AAA server, without awareness of the SMF. The SMF may forward the session request to the AAA server, to trigger the AAA server to determine whether to perform fast authentication for the session 1. When receiving a fast authentication success response message fed back the AAA server, the SMF may authorize the terminal device to establish the session 1 with the DN 1.

Figure 6A:
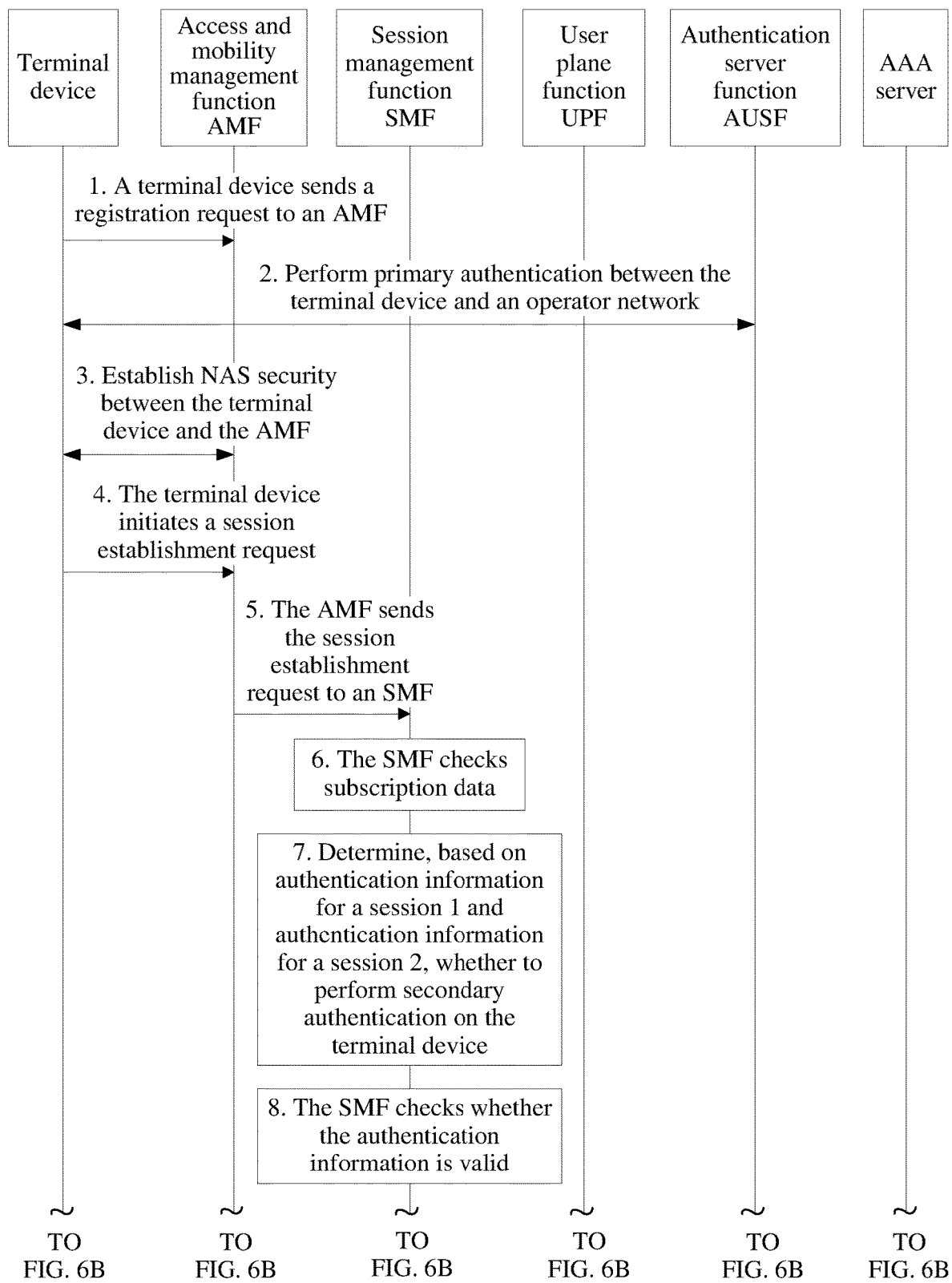
FIG. 6A and FIG. 6B are a schematic flowchart of fast authentication according to an embodiment of this application.
Figure 6B:
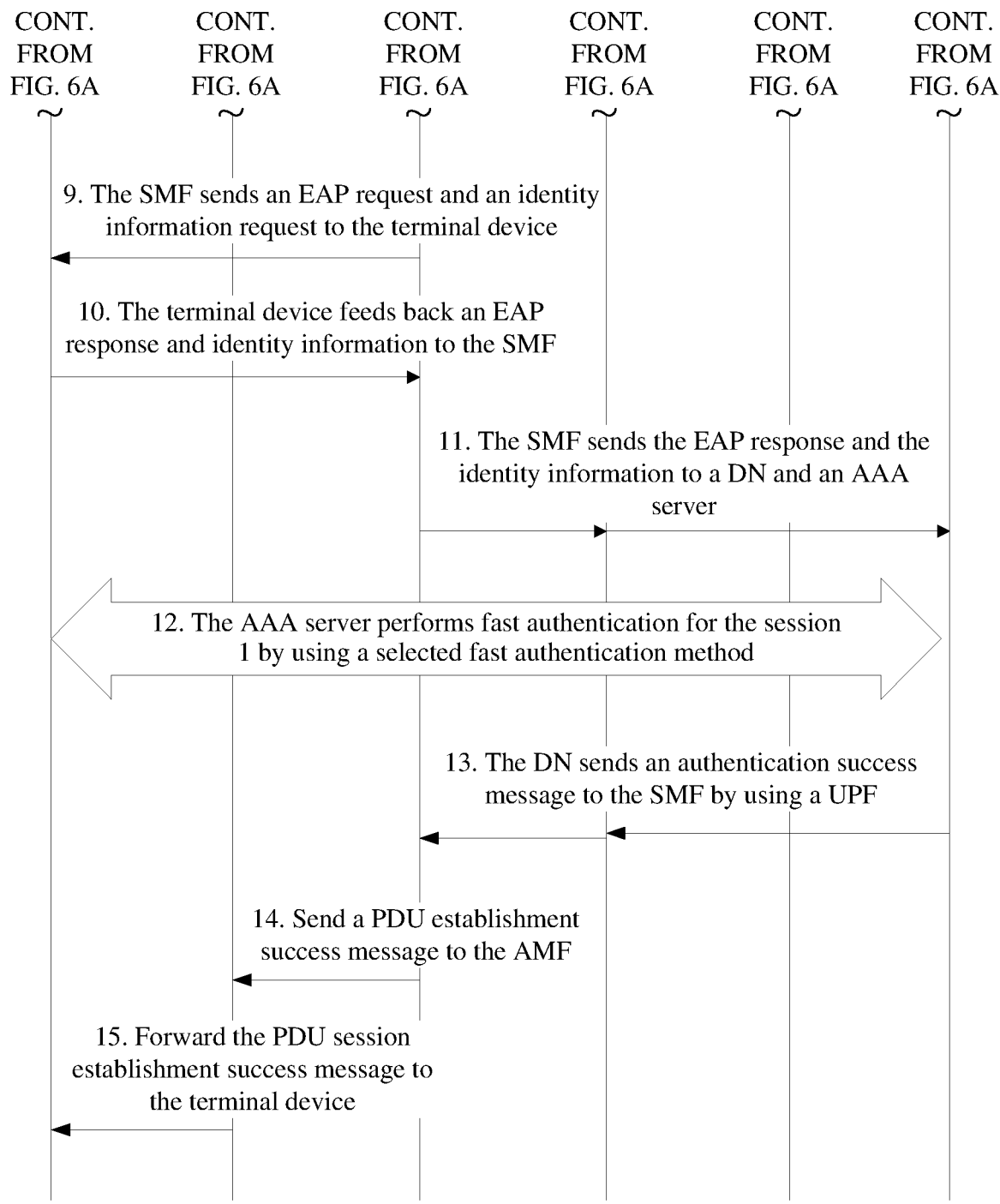

FIG. 6A and FIG. 6B are a schematic flowchart of fast authentication according to an embodiment of this application. The fast authentication of secondary authentication provided in this embodiment of this application may include the following steps.

1. A terminal device sends a registration request to an AMF.

2. Perform primary authentication between the terminal device and an operator network.

3. Establish NAS security between the terminal device and the AMF.

The implementation described in steps 1 to 3 is the same as that of steps 1 to 3 in the regular procedure of secondary authentication shown in FIG. 2A and FIG. 2B. Details are not repeated herein.

4. The terminal device initiates a session establishment request.

5. The AMF sends the session establishment request to an SMF.

Optionally, the terminal device may initiate, according to an authentication policy delivered or negotiated by the operator network, the session establishment request by using an implementation the same as that in step 4 in the embodiment shown in FIG. 2A and FIG. 2B. Optionally, the terminal device may add, to the session establishment request, authentication information for a session requested to be established and authentication information, such as a cookie and subscription data, for an earlier session stored by the terminal device before this, and send the session establishment request to the SMF.

6. The SMF checks subscription data.

Optionally, for an implementation of checking subscription data by the SMF, reference may be made to the implementation in the embodiment shown in FIG. 2A and FIG. 2B, and details are not repeated herein.

7. Determine, based on authentication information for a session 1 and authentication information for a session 2, whether to perform secondary authentication on the terminal device.

If the checking of subscription data in step 6 succeeds, and secondary authentication needs to be performed for a PDU session (the session 1), the SMF may determine, based on the authentication information for the session 1, whether fast authentication and/or authorization is supported, that is, whether the session 1 satisfies a fast authentication requirement.

8. The SMF checks whether the authentication information is valid.

If it is determined in step 7 that the session 1 supports fast authentication and authorization (for example, a session 2 for which secondary authentication has succeeded exists before the session 1), the SMF may check whether the authentication information such as a cookie is valid. If the authentication information such as the cookie is valid, the SMF may directly authorize the terminal device to establish the session 1 with the DN 1.

If it is determined in step 7 that the session 1 does not support fast authentication authorization (for example, the session 1 is a 1$^{st}$ session established with the DN 1 by the terminal device), the SMF may perform secondary authentication for the session 1 using the regular procedure of secondary authentication (the authentication procedure shown in FIG. 2A and FIG. 2B).

9 and 10. The SMF sends an EAP request and an identity information request to the terminal device, and the terminal device feeds back an EAP response and identity information to the SMF.

11. The SMF sends the EAP response and the identity information to a DN and an AAA server.

The SMF sends, to a UPF through a session connection established between the SMF and the UPF, the EAP response and the identity information of the terminal device sent from the terminal device. The UPF further sends the EAP response and the identity information of the terminal device to the DN and the AAA server.

12. The AAA server performs fast authentication for the session 1 by using a selected fast authentication method.

The AAA server may perform authentication for the session 1 according to an authentication policy defined in the EAP protocol by using the selected EAP fast authentication method.

13. The DN sends an authentication success message to the SMF by using a UPF.

14 and 15. The SMF sends a PDU establishment success message to the AMF, and the AMF forwards the PDU establishment success message to the terminal device.

After receiving the authentication success message, the SMF may authorize the terminal device to establish the session 1 with the DN.

Optionally, steps 9 to 13 are optional steps. Whether steps 9 to 13 are required depends on different authentication policies. For a PDU session supports only or supports preferentially a direct authorization manner, after a success in step 8, steps 14 and 15 may be directly performed. Details may be determined depending on actual application scenarios, and no limitation is imposed herein.

In this embodiment of this application, the SMF may store authentication information for PDU sessions of the terminal device, and when the terminal device initiates a plurality of PDU sessions, and the plurality of PDU sessions belong to one SMF, the SMF determines, based on the authentication information for PDU sessions stored in local storage space, whether the PDU sessions support fast authentication, and performs fast authentication or direct authorization on the PDU sessions when fast authentication is supported. The implementation of secondary authentication provided in this embodiment of this application can simplify an implementation procedure of secondary authentication, reduce resources such as signaling overheads for secondary authentication, and improve efficiency of secondary authentication, and therefore has better applicability.

Embodiment 2

An implementation described in Embodiment 2 is applicable to the foregoing category 2 of PDU sessions. The following describes an implementation of secondary authentication in an application scenario corresponding to the foregoing category 2 of PDU sessions with reference to FIG. 7 and FIG. 8A and FIG. 8B.

Figure 7:
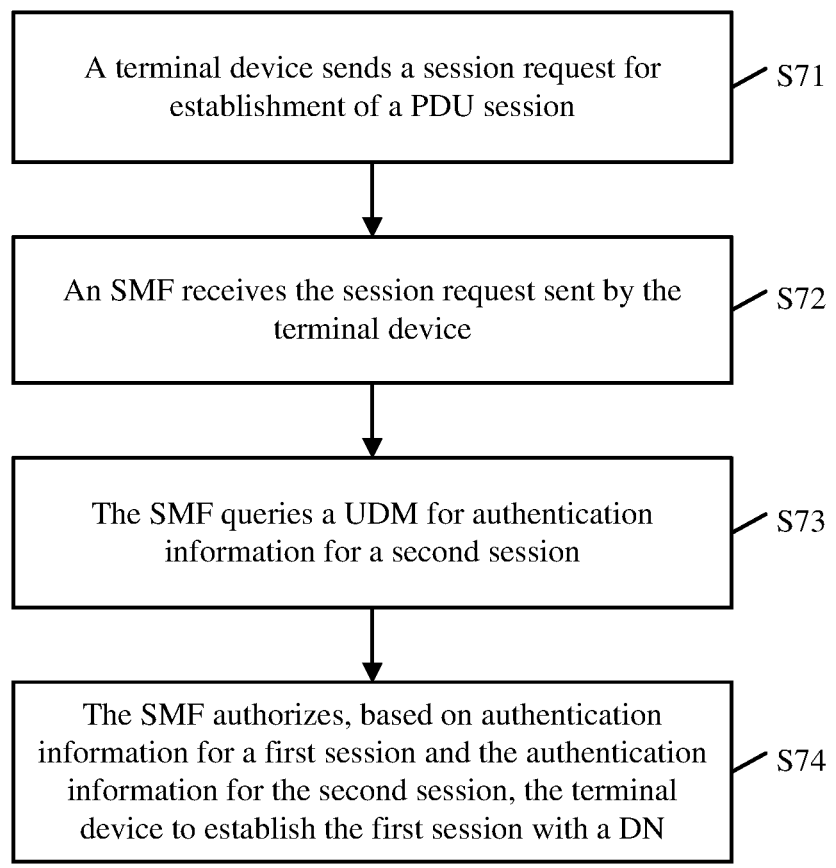
FIG. 7 is a schematic flowchart of another network security management method according to an embodiment of this application.

FIG. 7 is a schematic flowchart of a network security management method according to an embodiment of this application. The method provided in this embodiment of this application includes the following steps.

S71. A terminal device sends a session request for establishment of a PDU session.

S72. An SMF receives the session request sent by the terminal device.

Optionally, for a specific implementation of steps S71 and S72, reference may be made to the implementation provided in steps S51 and S52 in Embodiment 1. Details are not repeated herein.

S73. The SMF queries a UDM for authentication information for a second session.

Optionally, a session 1 and a session 2 do not belong to one SMF (for example, belong to an SMF 1 and an SMF 2), and therefore an SMF to which the to-be-established session 1 is connected has not stored or does not store the authentication information for the second session. There is no direct interface between SMFs, and in this case, corresponding authentication information such as cookies or subscription data may be stored in a UDM or an AAA server (that is, a second network device, where the SMF 1 is a first network device) of a DN.

Optionally, the SMF may send an authentication information query request to a network element such as the UDM, to query authentication information, stored in the UDM, for a plurality of sessions that are earlier initiated by the terminal device. Further, the SMF may query the UDM for the authentication information for the second session (for example, the session 2) whose authentication information is still within a validity period. For a specific expression form of the foregoing authentication information for the session 2, refer to the implementation described in the foregoing embodiment. Details are not repeated herein. Optionally, the authentication information query request described in this embodiment of this application may alternatively be described in other manners, for example, a query request or a data request. Details may be determined depending on actual application scenarios, and no limitation is imposed herein.

Optionally, at least one or two of a terminal device subscription ID on an operator network, a terminal device subscription ID on a first data network, and a security context of a session are used for authentication, fast authentication, or authorization on the terminal device.

S74. The SMF authorizes, based on authentication information for a first session and the authentication information for the second session, the terminal device to establish the first session with a DN.

Optionally, the SMF may determine, based on the authentication information for the session 1 and the authentication information for the session 2 that is obtained by querying a network element such as the UDM, whether to perform fast authentication of secondary authentication for the session 1, or directly authorize the terminal device to establish the session 1 with the DN. For a specific implementation, refer to the implementation described in step S74 in Embodiment 1. Details are not repeated herein.

Optionally, the SMF may send a security context query request to a network element such as the UDM, to request to obtain, from the UDM, security contexts of sessions earlier initiated by the terminal device, and select a security context of the session 2 from the security contexts. Further, when a security context of the session 1 is the same as the security context of the session 2, the terminal device may be directly authorized to establish the session 1 with the DN. The security context query request provided in this embodiment of this application may alternatively be described in other manners, for example, a query request or a security context obtaining request. Details may be determined depending on actual application scenarios, and no limitation is imposed herein.

Optionally, the SMF may alternatively send a session authentication or authorization policy query request to the UDM, and grant, according to a session authentication or authorization policy fed back by the UDM, the terminal device a privilege for establishing the session 1 with the DN and a granted privilege scope. Optionally, the session authentication or authorization policy query request described in this embodiment of this application may alternatively be described in other manners, for example, an authentication or authorization policy request. Details may be determined depending on actual application scenarios, and no limitation is imposed herein. The session authentication or authorization policy described in this embodiment of this application may alternatively be described in other manners. Details may be determined depending on actual application scenarios, and no limitation is imposed herein.

Figure 8A:
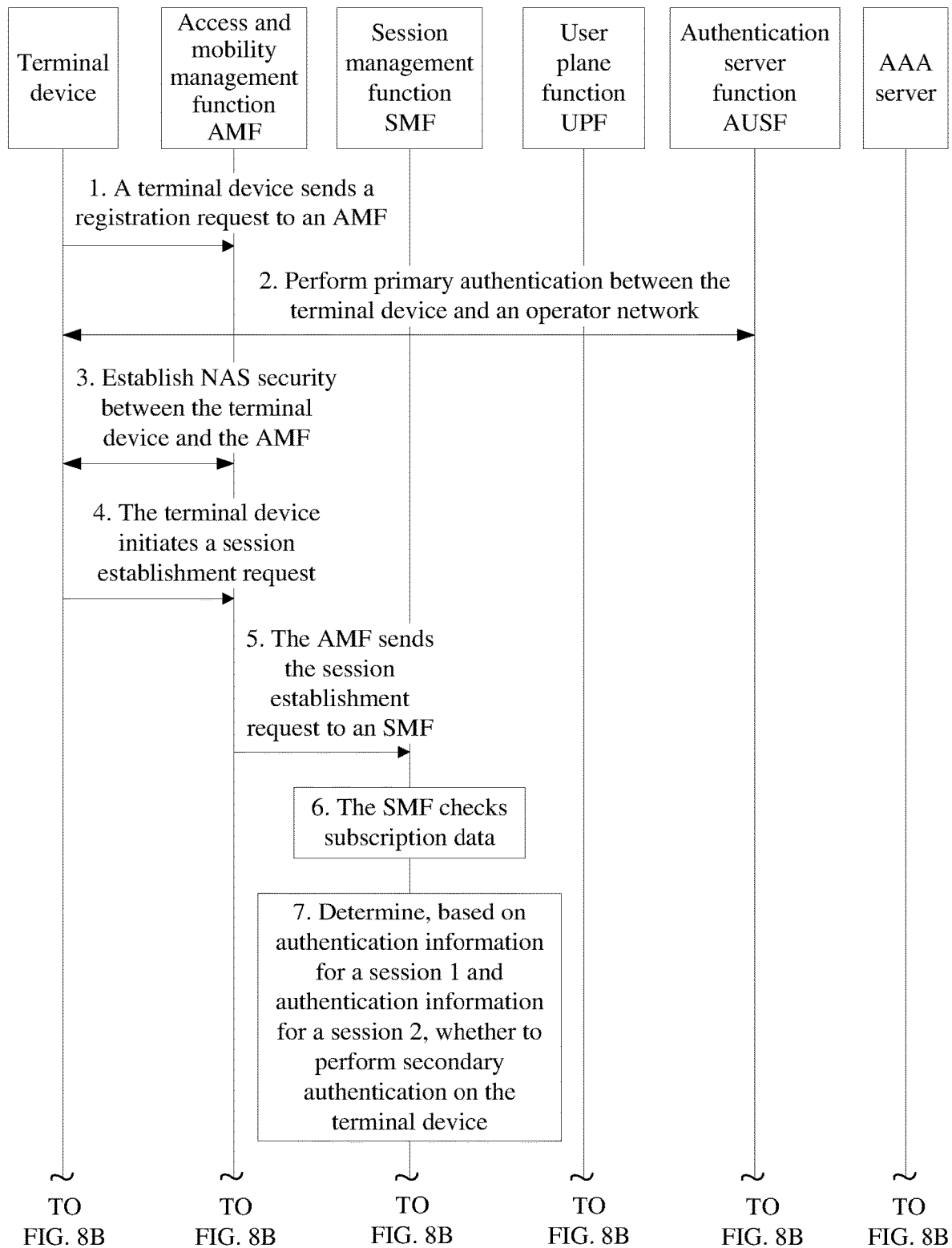
FIG. 8A and FIG. 8B are another schematic flowchart of fast authentication according to an embodiment of this application.
Figure 8B:
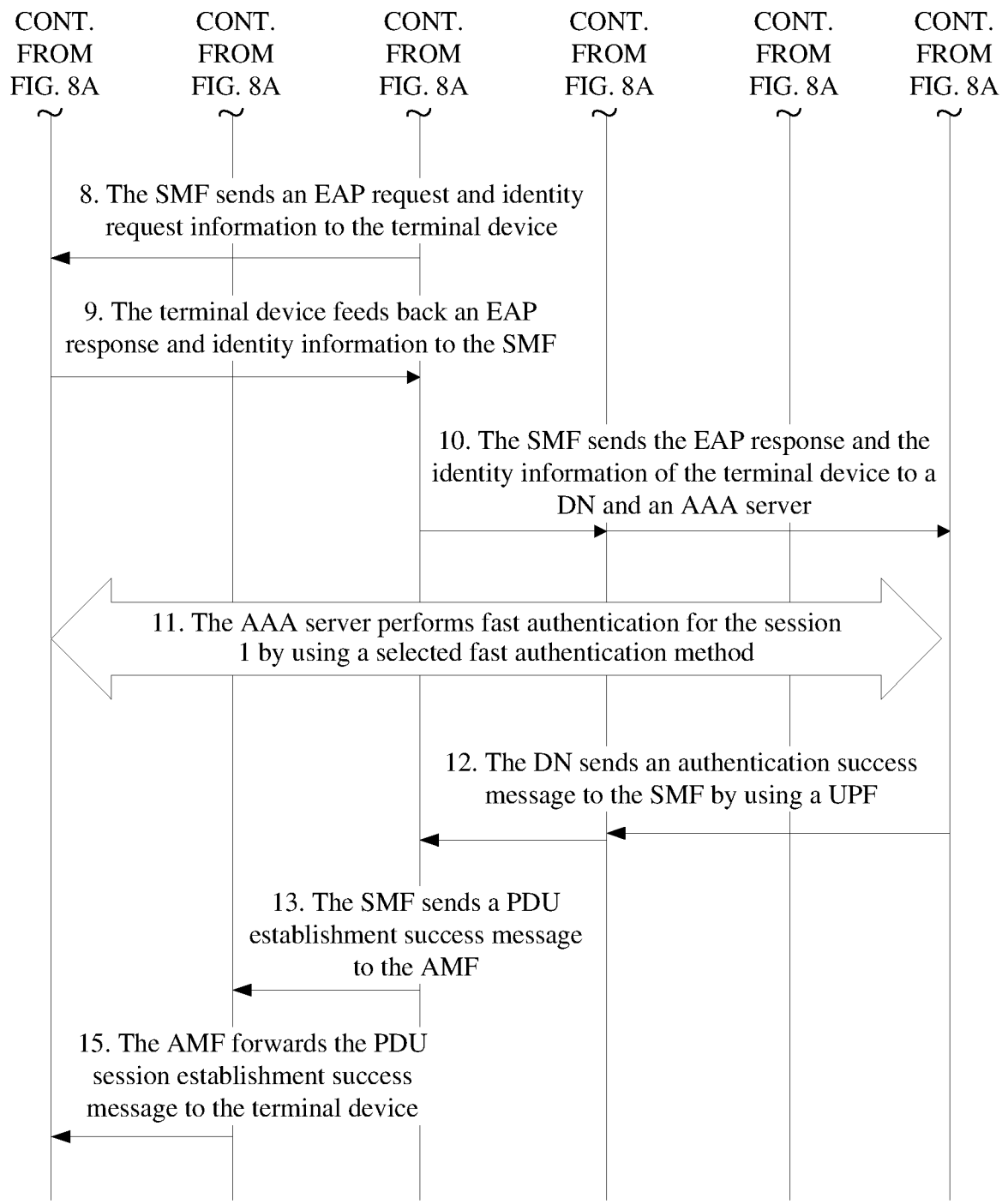

FIG. 8A and FIG. 8B are another schematic flowchart of fast authentication according to an embodiment of this application. The fast authentication of secondary authentication provided in this embodiment of this application may include the following steps.

1. A terminal device sends a registration request to an AMF.
2. Perform primary authentication between the terminal device and an operator network.
3. Establish NAS security between the terminal device and the AMF.

The implementation described in steps 1 to 3 is the same as that of steps 1 to 3 in the regular procedure of secondary authentication shown in FIG. 2A and FIG. 2B. Details are not repeated herein.

4. The terminal device initiates a session establishment request.
5. The AMF sends the session establishment request to an SMF.

Optionally, the terminal device may initiate, according to an authentication policy delivered or negotiated by the operator network, the session establishment request by using an implementation the same as that in step 4 in the embodiment shown in FIG. 2A and FIG. 2B. Optionally, the terminal device may add, to the session establishment request, authentication information for a session requested to be established and authentication information, such as a cookie and subscription data, for an earlier session stored by the terminal device before this, and send the session establishment request to the SMF.

6. The SMF checks subscription data.

Optionally, the SMF may obtain subscription data of the terminal device from a UDM, and check whether the subscription data of the terminal device stored in the UDM is the same as subscription data that is carried in the session establishment request and that is sent by the terminal device. If it is checked that the subscription data is the same, and secondary authentication needs to be performed on a PDU session (a session 1), the SMF may determine, based on authentication information for the session 1, whether fast authentication and/or authorization is supported, that is, whether the session 1 satisfies a fast authentication requirement.

Further, the SMF may obtain, from the UDM, authentication information for a session that is already authenticated by the terminal device, including identifier information of a DN corresponding to the PDU session that has been authenticated before, such as an SMF ID, a DNN, and an AAA server identifier. If information in the UDM is not updated in real time, the SMF may further obtain, from the UDM, information such as an expiration date of the identifier information of the DN corresponding to the PDU session that has been authenticated before.

7. Determine, based on authentication information for a session 1 and authentication information for a session 2, whether to perform secondary authentication on the terminal device.

If the checking of the subscription data in step 6 succeeds, and secondary authentication needs to be performed for the PDU session (the session 1), the SMF may determine, based on the authentication information for the session 1 and authentication information for an earlier session obtained by querying the UDM, whether the session 1 satisfies a fast authentication requirement. For an implementation of determining, based on the authentication information for the session 1 and the authentication information for the earlier session (for example, the session 2), whether to perform fast authentication for the session 1, refer to the foregoing implementation. Details are not repeated herein.

If it is determined that the session 1 supports fast authentication authorization (for example, a session 2 for which secondary authentication has succeeded s exists before the session 1), the SMF may directly authorize the terminal device to establish the session 1 with a DN 1.

If it is determined that the session 1 does not support fast authentication authorization (for example, the session 1 is a $1^{st}$ session established with a DN 1 by the terminal device), the SMF may perform secondary authentication for the session 1 using the regular procedure of secondary authentication (the authentication procedure shown in FIG. 2A and FIG. 2B).

8 and 9. The SMF sends an EAP request and identity request information to the terminal device, and the terminal device feeds back an EAP response and identity information to the SMF.

10. The SMF sends the EAP response and the identity information of the terminal device to a DN and an AAA server.

The SMF sends, to a UPF through a session connection established between the SMF and the UPF, the EAP response and the identity information of the terminal device sent from the terminal device. The UPF further sends the EAP response and the identity information of the terminal device to the DN and the AAA server.

11. The AAA server performs fast authentication for the session 1 by using a selected fast authentication method.

The AAA server may perform authentication for the session 1 according to an authentication policy defined in the EAP protocol by using the selected EAP fast authentication method.

12. The DN sends an authentication success message to the SMF by using a UPF.

13 and 14. The SMF sends a PDU establishment success message to the AMF, and the AMF forwards the PDU establishment success message to the terminal device.

After receiving the authentication success message, the SMF may authorize the terminal device to establish the session 1 with the DN.

Optionally, steps 8 to 12 are optional steps. Whether steps 8 to 12 are required depends on different authentication policies. For a PDU session supports only or supports preferentially a direct authorization manner, after a success in step 7, steps 13 and 14 may be directly performed. Details may be determined depending on actual application scenarios, and no limitation is imposed herein.

In this embodiment of this application, the UDM may store authentication information for PDU sessions of the terminal device, and when the terminal device initiates a plurality of PDU sessions, and the plurality of PDU sessions belong to different SMFs, any one of the SMFs queries the UDM for authentication information for a session already authenticated by the terminal device. The SMF determines, based on the authentication information for PDU sessions stored in the UDM and a PDU session requested to be established by a session establishment request, whether fast authentication is supported, and performs fast authentication or direct authorization on the PDU session when fast authentication is supported. In this embodiment of this application, the UDM may store the authentication information for PDU sessions of the terminal device, the SMF may query the UDM for the authentication information for PDU sessions of the terminal device, and may further determine or perform, based on authentication information for the PDU session requested to be established by the session establishment request, fast authentication for the PDU session. This diversifies implementations of fast authentication. The implementation of secondary authentication provided in this embodiment of this application can simplify an implementation procedure of secondary authentication, reduce resources such as signaling overheads for secondary authentication, and improve efficiency of secondary authentication, and therefore has better applicability.

Figure 9:
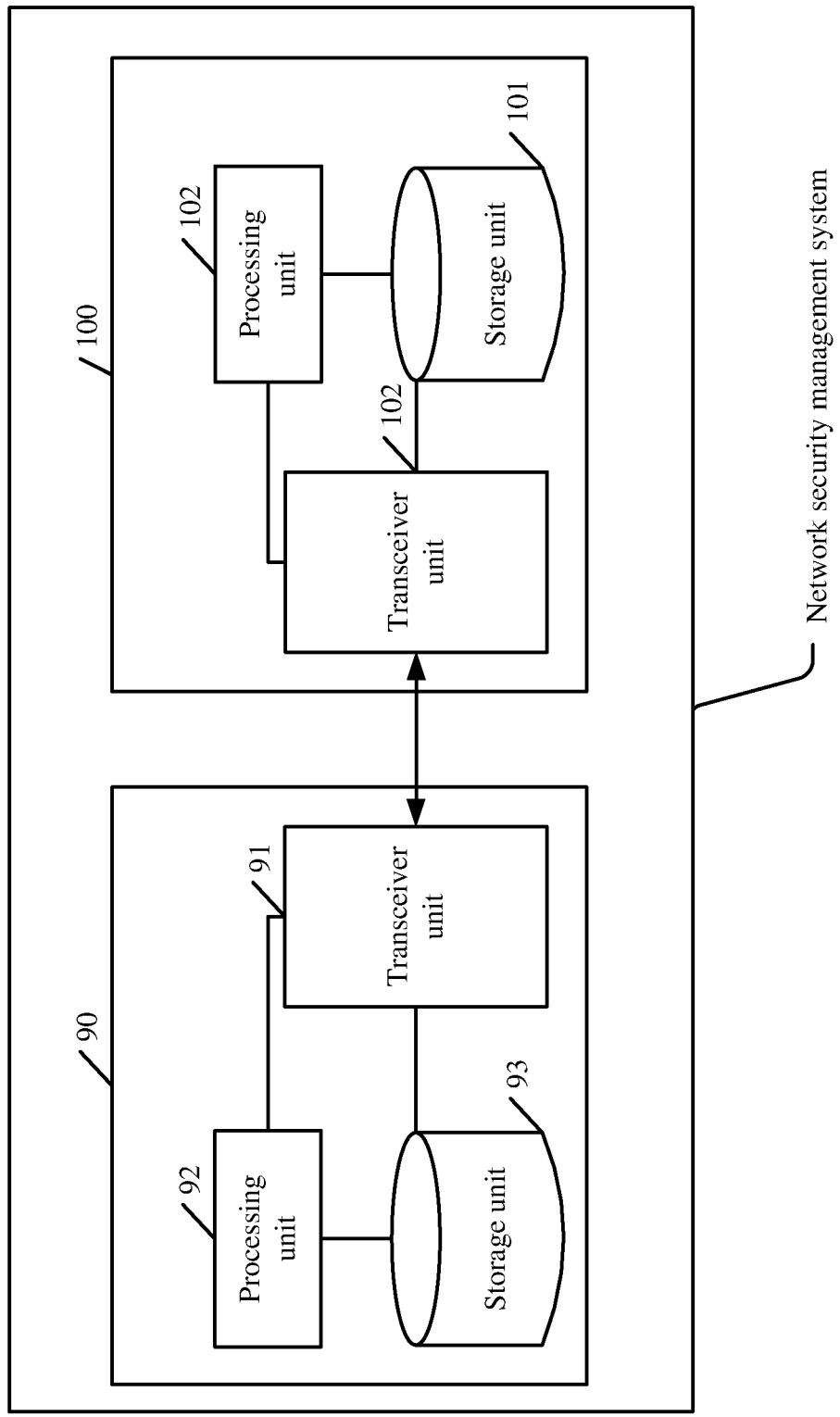
FIG. 9 is a schematic structural diagram of a network security management system according to an embodiment of this application.

FIG. 9 is a schematic structural diagram of a network security management system according to an embodiment of this application. The network security management system provided in this embodiment of this application may include a terminal device, a network device of an operator network, and an authentication server of a data network. The network device of the operator network may include a first network device 90 and a second network device 100. The first network device 90 may be specifically the identity authenticator described in the foregoing embodiments, for example, a device such as an SMF. The first network device 90 may include a transceiver unit 91, a processing unit 92, and a storage unit 93.

The storage unit 93 is configured to store subscription data of the terminal device and/or authentication information for sessions of the terminal device.

The transceiver unit 91 is configured to receive a session request sent by the terminal device, where the session request is used to request establishment of a first session with a first data network, and the session request includes first authentication information for the first session.

The processing unit 92 is configured to authorize, based on the first authentication information received by the transceiver unit 91 and preset second authentication information for a second session of the terminal device, the terminal device to establish the first session with the first data network.

Optionally, the first authentication information includes identifier information of the first data network, and the second authentication information includes identifier information of a second data network to which the second session is connected; and the processing unit 92 is configured to:
obtain the preset identifier information of the second data network; and if the identifier information of the first data network is the same as the identifier information of the second data network, authorize the terminal device to establish the first session with the first data network.

Optionally, that the identifier information of the first data network is the same as the identifier information of the second data network includes at least one of the following:
a data network number DNN of the first data network is the same as a DNN of the second data network; or
an authentication server of the first data network is the same as an authentication server of the second data network; or
a synchronous authentication server group to which an authentication server of the first data network belongs is the same as a synchronous authentication server group to which an authentication server of the second data network belongs.

Optionally, the operator network further includes the second network device; and the transceiver unit 91 is further configured to:
send an authentication information query request to the second network device, where the authentication information query request is used to query authentication information for a session of the terminal device; and
receive the second authentication information for the second session fed back by the second network device, and obtain the identifier information of the second data network from the second authentication information, where the second session is at least one of a plurality of sessions of the terminal device, and the second authentication information or authorization information for the second session is still within a validity period.

Optionally, the first authentication information further includes a first security context used by the first session, and the second authentication information further includes a second security context used by the second session; and the processing unit 92 is configured to:

obtain the preset second security context; and if the second security context is the same as the first security context, authorize the terminal device to establish the first session with the data network.

Optionally, the processing unit 92 is further configured to update the second security context; and the transceiver unit 91 is further configured to instruct the terminal device to update a security context of the second session stored in the terminal device.

Optionally, the transceiver unit 91 is further configured to send a security context query request to the second network device, where the security context query request is used to query a security context of a session of the terminal device; and the transceiver unit 91 is further configured to receive the second security context of the second session fed back by the second network device, where the second session is at least one of a plurality of sessions of the terminal device, and the security context of the second session is still within a validity period.

Optionally, the transceiver unit 91 is further configured to send a session authentication or authorization policy query request to the second network device;

the transceiver unit 91 is further configured to receive a session authentication or authorization policy fed back by the second network device; and the processing unit 92 is further configured to grant, according to the session authentication or authorization policy received by the transceiver unit, the terminal device a privilege scope for establishing the first session with the first data network.

Optionally, the transceiver unit 91 is further configured to: when the identifier information of the first data network is the same as the identifier information of the second data network, send a session authentication request to an authentication server of the first data network, where the session authentication request is used to instruct the authentication server to initiate fast authentication for the first session based on the second authentication information; and the processing unit 92 is further configured to: when the transceiver unit receives a fast authentication success response message fed back by the authentication server, authorize the terminal device to establish the first session with the first data network.

Optionally, the transceiver unit 91 is further configured to forward the session request to an authentication server of the first data network. The session request is used to trigger the authentication server to determine whether to perform fast authentication for the first session; and the processing unit 92 is further configured to: when the transceiver unit 91 receives a fast authentication success response message fed back by the authentication server, authorize the terminal device to establish the first session with the first data network.

The second network device 100 on the operator network may be specifically a data management network element such as the UDM described in the foregoing embodiment. The second network device 100 may include a storage unit 101, a transceiver unit 102, and a processing unit 103. The storage unit 101 is configured to store subscription data of the terminal device and/or authentication information for sessions of the terminal device.

The transceiver unit 102 is configured to receive an authentication information query request sent by the second network device, where the authentication information query request includes identifier information of the terminal device.

The transceiver unit 102 is configured to feed back authentication information for a session of the terminal device to the second network device, to trigger the second network device to authorize the terminal device to establish a first session with the first data network.

The session of the terminal device includes at least one session initiated by the terminal device for connecting to the first data network.

Optionally, the authentication information for the session of the terminal device includes at least one of the following: a terminal device ID, a terminal device subscription ID on the operator network, a terminal device subscription ID on the first data network, an ID of a network device, to which the session is connected, of the operator network, a security context of the session, identifier information of a data network to which the session is connected, identifier information of an authentication server to which the session is connected, and a validity period of successful session authentication.

Optionally, at least one or two of the terminal device subscription ID on the operator network, the terminal device subscription ID on the first data network, and the security context of the session are used for authentication, fast authentication, or authorization on the terminal device.

Optionally, the authentication information query request further includes identifier information of the first data network; and the network device further includes:

the processing unit 103, configured to determine, from a plurality of sessions of the terminal device prestored in the storage unit, a second session connected to the first data network, where the transceiver unit 102 is configured to feed back authentication information for the second session determined by the processing unit to the second network device, where the second session is at least one of the plurality of sessions of the terminal device, and the authentication information or authorization information for the second session is still within a validity period.

Optionally, the storage unit 101 is further configured to store a session authentication or authorization policy; and the transceiver unit 102 is further configured to receive a session authentication or authorization policy query request sent by the second network device, and feed back the session authentication or authorization policy to the second network device, where the session authentication or authorization policy is used to instruct the second network device to grant the terminal device a privilege scope for establishing the first session with the first data network.

In specific implementation, the first network device (for example, the SMF) and the second network device (for example, the UDM) may perform, by using the units embedded in the first network device and those in the second network device, the implementation performed by the SMF or the UDM in the foregoing embodiments. Details are not repeated herein.

Figure 10:
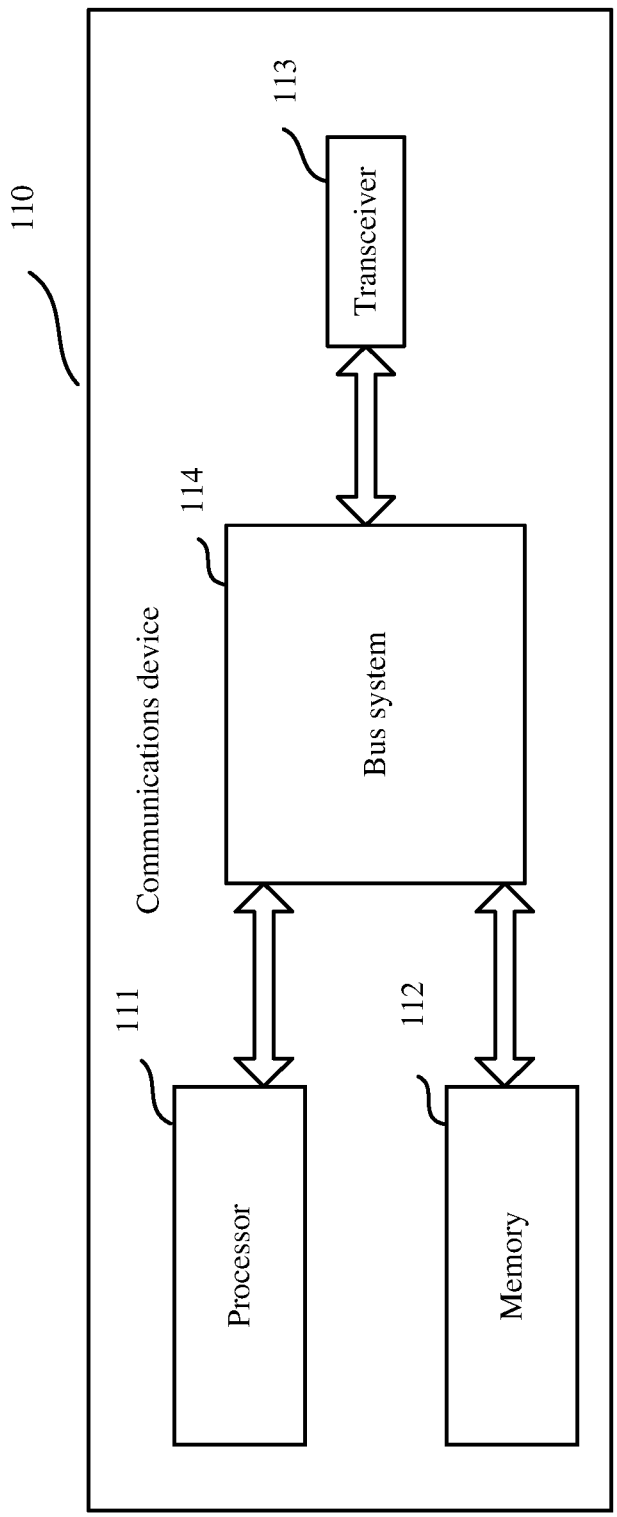
FIG. 10 is a schematic structural diagram of a communications device according to an embodiment of this application.

FIG. 10 is a schematic structural diagram of a communications device according to an embodiment of this application. As shown in FIG. 10, the communications device 110 provided in this embodiment of this application includes a processor 111, a memory 112, a transceiver 113, and a bus system 114.

The processor 111, the memory 112, and the transceiver 113 are connected by using the bus system 114.

The memory 112 is configured to store a program and/or processing data of the communications device. Specifically, the program may include program code, and the program code includes a computer operation instruction. The memory 112 includes but is not limited to a random access memory (RAM), a read-only memory (ROM), an erasable programmable read only memory (EPROM), or a compact disc read-only memory (CD-ROM). In FIG. 10, only one memory is shown. Certainly, a plurality of memories may be configured as required. The memory 112 may alternatively be a memory in the processor 111. No limitation is imposed herein.

The memory 112 stores the following elements: executable modules or data structures, or a subset thereof, or an extended set thereof;
operation instructions, including various operation instructions, used to implement various operations; and
an operating system, including various system programs, used to implement various basic services and process hardware-based tasks.

The processor 111 controls operations of the communications device 110. The processor 111 may be one or more central processing units (CPUs). When the processor 111 is one CPU, the CPU may be a single-core CPU or may be a multi-core CPU.

During specific application, components of the communications device 110 are coupled together by using the bus system 114. In addition to a data bus, the bus system 114 includes a power bus, a control bus, a status signal bus, and the like. However, for clear description, various types of buses are marked in FIG. 10 as the bus system 114, and for ease of illustration, are only schematically drawn in FIG. 10.

FIG. 2A and FIG. 2B, FIG. 5, FIG. 6A and FIG. 6B, FIG. 7, or FIG. 8A and FIG. 8B provided in the foregoing embodiments of this application, or the method executed by the SMF disclosed in the foregoing embodiments, or the method executed by the UDM or the AAA server disclosed in the foregoing embodiments may be applied to the processor 111, or may be implemented by the processor 111. The processor 111 may be an integrated circuit chip, and has a signal processing capability. In an implementation process, steps in the foregoing methods can be implemented by using a hardware integrated logic circuit in the processor 111, or by using software-form instructions. The processor 111 may be a general purpose processor, a digital signal processor (DSP), an application-specific integrated circuit (ASIC), a field programmable gate array (FPGA), or another programmable logic device, a discrete gate or a transistor logic device, or a discrete hardware component. The processor 111 may implement or perform the methods, steps, and logical block diagrams that are disclosed in the embodiments of this application. The general purpose processor may be a microprocessor, or the processor may be any conventional processor or the like. Steps of the methods disclosed with reference to the embodiments of this application may be directly executed and completed by using a hardware decoding processor, or may be executed and completed by using a combination of hardware and software modules in the decoding processor. A software module may be located in a mature storage medium in the art such as a random access memory, a flash memory, a read-only memory, a programmable read-only memory, an electrically erasable programmable memory, or a register. The storage medium is located in the memory 112. The processor 111 reads information in the memory 112 and executes, in combination with hardware thereof, FIG. 2A and FIG. 2B, FIG. 5, FIG. 6A and FIG. 6B, FIG. 7, or FIG. 8A and FIG. 8B, or the method executed by the SMF disclosed in the foregoing embodiments, or the method executed by the UDM or the AAA server disclosed in the foregoing embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A method for network security management, the method comprising:
receiving, by a first network device, a first session request from a terminal device, wherein the first session request is used to request establishment of a first session with a first data network; and
based on a first authentication server corresponding to the first data network being the same as a second authentication server corresponding to a second data network, authorizing, by the first network device, the terminal device to establish the first session with the first data network, wherein a second session has been established between the terminal device and the second data network.

2. The method according to claim 1, further comprising:
obtaining, by the first network device, authentication information of the second session, wherein the authentication information comprises an identifier of the second authentication server.

3. The method according to claim 2, wherein the obtaining, by the first network device, the authentication information of the second session comprises:
obtaining, by the first network device from local storage space, the authentication information of the second session.

4. The method according to claim 3, further comprising:
storing, by the first network device, the authentication information of the second session in the local storage space after secondary authentication for the second session succeeds.

5. The method according to claim 2, wherein the obtaining, by the first network device, the authentication information of the second session comprises:
querying, by the first network device, a unified data management network element for the authentication information of the second session.

6. The method according to claim 5, further comprising:
storing, by the first network device, the authentication information of the second session into the unified data management network element after secondary authentication for the second session succeeds.

7. The method according to claim 1, wherein the first session request comprises at least one of an identifier of the terminal device or identifier information of the first data network.

8. The method according to claim 1, wherein the second authentication server has previously authenticated the second data network.

9. The method according to claim 1, wherein the authorizing, by the first network device, the terminal device to establish the first session with the first data network comprises:
directly authorizing, by the first network device, the terminal device to establish the first session with the first data network without initiating secondary authentication for the first session.

10. The method according to claim 1, wherein the first session request is received by the first network device from the terminal device via a second network device that forwards the first session request to the first network device.

11. An apparatus, comprising:
at least one processor; and
at least one memory, wherein the at least one memory stores instructions that are executable by the at least one processor to cause the apparatus to:
receive a first session request from a terminal device, wherein the first session request is used to request establishment of a first session with a first data network; and
based on a first authentication server corresponding to the first data network being the same as a second authentication server corresponding to a second data network, authorize the terminal device to establish the first session with the first data network, wherein a second session has been established between the terminal device and the second data network.

12. The apparatus according to claim 11, wherein the at least one memory stores instructions that are executable by the at least one processor to further cause the apparatus to:
obtain authentication information of the second session, wherein the authentication information comprises an identifier of the second authentication server.

13. The apparatus according to claim 12, wherein the at least one memory stores instructions that are executable by the at least one processor to further cause the apparatus to:
obtain from local storage space the authentication information of the second session.

14. The apparatus according to claim 13, wherein the at least one memory stores instructions that are executable by the at least one processor to further cause the apparatus to:
store the authentication information of the second session in the local storage space after secondary authentication for the second session succeeds.

15. The apparatus according to claim 12, wherein the at least one memory stores instructions that are executable by the at least one processor to further cause the apparatus to:
query a unified data management network element for the authentication information of the second session.

16. The apparatus according to claim 15, wherein the at least one memory stores instructions that are executable by the at least one processor to further cause the apparatus to:
store the authentication information of the second session into the unified data management network element after secondary authentication for the second session succeeds.

17. The apparatus according to claim 11, wherein the first session request comprises at least one of an identifier of the terminal device or identifier information of the first data network.

18. The apparatus according to claim 11, wherein the second authentication server has previously authenticated the second data network.

19. The apparatus according to claim 11, wherein the at least one memory stores instructions that are executable by the at least one processor to further cause the apparatus to:
directly authorize the terminal device to establish the first session with the first data network without initiating secondary authentication for the first session.

20. A non-transitory computer-readable medium storing instructions that are executable by a processor to cause an apparatus to:
receive a first session request from a terminal device, wherein the first session request is used to request establishment of a first session with a first data network; and
based on a first authentication server corresponding to the first data network being the same as a second authentication server corresponding to a second data network, authorize the terminal device to establish the first session with the first data network, wherein a second session has been established between the terminal device and the second data network.

* * * * *